(12) United States Patent
Dixit

(10) Patent No.: US 10,814,883 B1
(45) Date of Patent: Oct. 27, 2020

(54) PROGNOSTICS FOR IMPROVED MAINTENANCE OF VEHICLES

(71) Applicant: Northrop Grumman Systems Corporation, Falls Church, VA (US)

(72) Inventor: Sunil Dixit, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/801,596

(22) Filed: Feb. 26, 2020

Related U.S. Application Data

(63) Continuation-in-part of application No. 16/583,678, filed on Sep. 26, 2019, which is a continuation of application No. 16/163,726, filed on Oct. 18, 2018, now Pat. No. 10,676,048.

(51) Int. Cl.
  *B60W 50/02* (2012.01)
  *G05B 23/00* (2006.01)
  *B60W 50/04* (2006.01)

(52) U.S. Cl.
  CPC ............. *B60W 50/02* (2013.01); *B60W 50/04* (2013.01); *G05B 23/00* (2013.01)

(58) Field of Classification Search
  CPC ........ B60W 50/02; B60W 50/04; G05B 23/00
  USPC ....................................................... 701/29.1
  See application file for complete search history.

(56) References Cited

U.S. PATENT DOCUMENTS

| | | |
|---|---|---|
| 6,208,955 B1 | 3/2001 | Provan et al. |
| 7,457,785 B1 | 11/2008 | Greitzer |
| 8,838,324 B2 | 9/2014 | Suzuki et al. |
| 8,855,943 B1 | 10/2014 | Matsui et al. |
| 2005/0212523 A1 | 9/2005 | Chang et al. |
| 2006/0064291 A1 | 3/2006 | Pattipatti et al. |

(Continued)

OTHER PUBLICATIONS

Chen Xiongzi, Yu Jinsong, Tang Diyin and Wang Yingxun, "Remaining useful life prognostic estimation for aircraft subsystems or components: A review," IEEE 2011 10th International Conference on Electronic Measurement & Instruments, Chengdu, 2011, pp. 94-98, doi: 10.1109/ICEMI.2011.6037773.*

(Continued)

*Primary Examiner* — Brian P Sweeney
(74) *Attorney, Agent, or Firm* — McCracken & Gillen LLC

(57) ABSTRACT

An exemplary method implemented by a computing system determines a prediction of degradation of components in a complex vehicle to enable cost effective maintenance and enhance vehicle operational availability (vehicle readiness for missions) based on currently measured performance-based parameters associated with the respective components. Residues from models of the components reflect differences between performance as determined by the models of the components and currently measured actual performance parameters. The residues are used determine a level of degradation and a rate of change of degradation for the respective components. The remaining useful life (RUL) of the respective components is the projected/predicted time of remaining acceptable performance of the respective component, and is based on the current degradation level, the rate of change of degradation, and a stored threshold level of degradation that is a maximum amount of degradation that is acceptable.

10 Claims, 23 Drawing Sheets

(56) References Cited

U.S. PATENT DOCUMENTS

2008/0312783 A1    12/2008  Mansouri et al.
2015/0149119 A1     5/2015  Fansler
2019/0147670 A1     5/2019  Chopra et al.

OTHER PUBLICATIONS

International Search Report in related Application Serial No. PCT/US19/43362, dated Nov. 8, 2019, 11 pages.

* cited by examiner

FIG. 28

| Failure/Degradation | Quality of Service (QoS) |
|---|---|
| ☐ Incipient Failures | ☐ System Availability |
| ☐ Remaining Useful Life (RUL) | ☐ Predicted System Availability |
| ☐ End of Life (EOL) | ☐ Design Reference Mission Profile |
|  | ☐ Current Mission Profile |

PROGNOSTICS FOR IMPROVED MAINTENANCE OF VEHICLES

CROSS REFERENCE TO RELATED APPLICATION(S)

The present application is a continuation-in-part of U.S. application Ser. No. 16/583,678 filed on Sep. 26, 2019, entitled HIGH FREQUENCY SENSOR DATA ANALYSIS AND INTEGRATION WITH LOW FREQUENCY SENSOR DATA USED FOR PARAMETRIC DATA MODELING FOR MODEL BASED REASONERS, which was a continuation-in-part of U.S. application Ser. No. 16/163,726 filed on Oct. 18, 2018, entitled, PARAMETRIC DATA MODELING FOR MODEL BASED REASONERS the entire contents of which are incorporated herein by reference.

TECHNICAL FIELD

Embodiments of the present invention generally relate to determining when maintenance of components of complex vehicles, e.g. aircraft, is needed. More specifically, the embodiments identify on a component level whether or not maintenance of the component is required based on performance and usage data associated with the component and projections of future performance based on their condition

BACKGROUND

Maintenance of complex systems, such as vehicles, aircraft, spacecraft and other systems, represents a significant cost of operation. Maintenance of such systems is typically done on a predetermined schedule for the various components of the system. The schedule may be solely time-based, e.g. every three months, or maybe based on a combination of time, usage, and reliability metrics, e.g. every three months or 1000 hours of operation determined by mean-time-between-failure (MTBF) component reliability calculations. The amount of time and usage are typically based on the performance history of the same or similar components as utilized in a similar operational environment. Scheduled maintenance based entirely on such reliability metrics has been shown to be less than optimal in numerous commercial and department of defense systems. The Office of the Secretary of Defense (OSD) issued a directive 4151.22 (mandate) that all systems will follow Condition Based Maintenance Plus (CBM+) processes by the year 2032. CBM+ processes provide for maintenance to be scheduled based on the condition of the component and no longer on predetermined time-based and usage-based maintenance. However, compliance with the CBM+ requirements has presented significant challenges.

Although such predetermined scheduled maintenance of components has been satisfactory in some environments, this type of maintenance has not performed as well for some equipment/vehicles in other environments. Predetermined scheduled maintenance has proved to be costly and the cause for delays in vehicle availability due to unnecessary maintenance that may result in inadvertent mishaps by taking parts out for testing and replacing them. For example, consider a jet aircraft. The same type of jet aircraft may be utilized in a variety of extremely different environmental conditions, e.g. a desert with widely varying temperatures and blowing sand versus a temperate latitude with only minor airborne dust. Additionally, if the same aircraft is in operation under the same external environmental conditions, different pilots, especially military pilots, may choose to fly the same aircraft in substantially different ways causing different load variations on aircraft structures. Also, different missions will pose differing levels of stress on the components of the aircraft. Hence, predetermined scheduled maintenance for components may result in not performing needed maintenance due to more than anticipated stress or may result in performing unneeded maintenance due to a significantly lower level of stress than anticipated. Reliable prognostics for the improved timing of maintenance for components of vehicles will provide a more cost-effective solution as well as increasing the operational availability of an aircraft/system avoiding unneeded maintenance, and better utilization of the maintenance workforce. Therefore, there exists a need for a more accurate prediction of the future remaining useful life of a component and for an improved determination of the need for maintenance of components in a complex system.

SUMMARY

One object of embodiments of the present invention is to satisfy the need for reliable prognostics for the improved timing of component level maintenance in a complex vehicle.

An object of one embodiment of the present invention is an avionics based prognostics engine that collects data about components from various sources, analyses this data for component degradation in real time, stores this data for use in generating predictive maintenance schedules based on actual component current and future predicted performance.

An object of one of the embodiments of the present invention is a three-tier model-based approach for models of the components/equipment: 1) data driven functional/logical model of the equipment, 2) physics-based model of the equipment, and 3) empirical model of the equipment. The first two are blue prints of the equipment functions, behaviors, sematics, and attributes while the third accounts for localized variations of the aircraft/system environments and usage. The combination of this three-tier model-based approach provides reliable integrated aircraft/system prognostics of performance and condition-based maintenance determinations.

An object of embodiments of the present invention is a fully integrated approach to an aircraft/system prognostics of equipment degradations and need-based maintenance determinations based on information on interrelated components versus isolated maintenance determinations limited to only the component under consideration.

An exemplary method is implemented by a computing system that determines a prediction of degradation and degradation propagation of components in a complex vehicle to enable cost effective condition-based maintenance and enhance vehicle operational availability by reducing the excessive down time of the vehicle. Real-time data of a current state of performance parameters of the components is received. At least one of a physics-based model of the respective components and an empirical model of the respective components determines a first residue that is a difference between the current states of the performance parameters of the components and corresponding states of the performance parameters of the components as determined by at least one of the physics-based model and the empirical model. A physical system model of the respective components determines a second residue that is a difference between the current states of the performance parameters of the components and past ranges of states of performance parameters of the corresponding components as determined by the physical system model. A level of degradation for the respective components and a rate of change of degradation for the respective components is determined based on a combination of the first and second residues. The remaining useful life (RUL) of the respective components is predicted based on the current level of degradation, the rate of change of degradation of the components, and a stored threshold level of maximum degradation for which performance is acceptable.

DESCRIPTION OF THE DRAWINGS

Some example embodiments of the present invention incorporate inputs from an IVHM system and a data fusion module which are described below with reference to the accompanying drawings in order to better understand the operation of embodiments of the present invention in which:

FIG. 28 illustrates quality of service metrics at the component level.

DETAILED DESCRIPTION

In one embodiment the prognostics system utilizes inputs from the Data Fusion Module 1175 and the MBR Diagnostics Engine 106. The IVHM system includes all modules in FIG. 11, the MBR diagnostics system, and the current subject prognostics system, the description of which begins by referring to the text associated with FIG. 26 following the description of the MBR Diagnostics Engine and the Data Fusion Module.

IVHM using Model Driven Architectures (MDA) and Model Based Engineering (MBE) is a solution where software and hardware elements are flight qualified once instead of every time the system is changed or upgraded. This results in significant cost savings by using an XML format configuration file containing a model with the diagnostics domain knowledge of the system. The model needs to be verified for accuracy but does not require expensive and time-consuming software flight qualification. This saves between 25%-35% in military operations and support costs.

Figure 1:
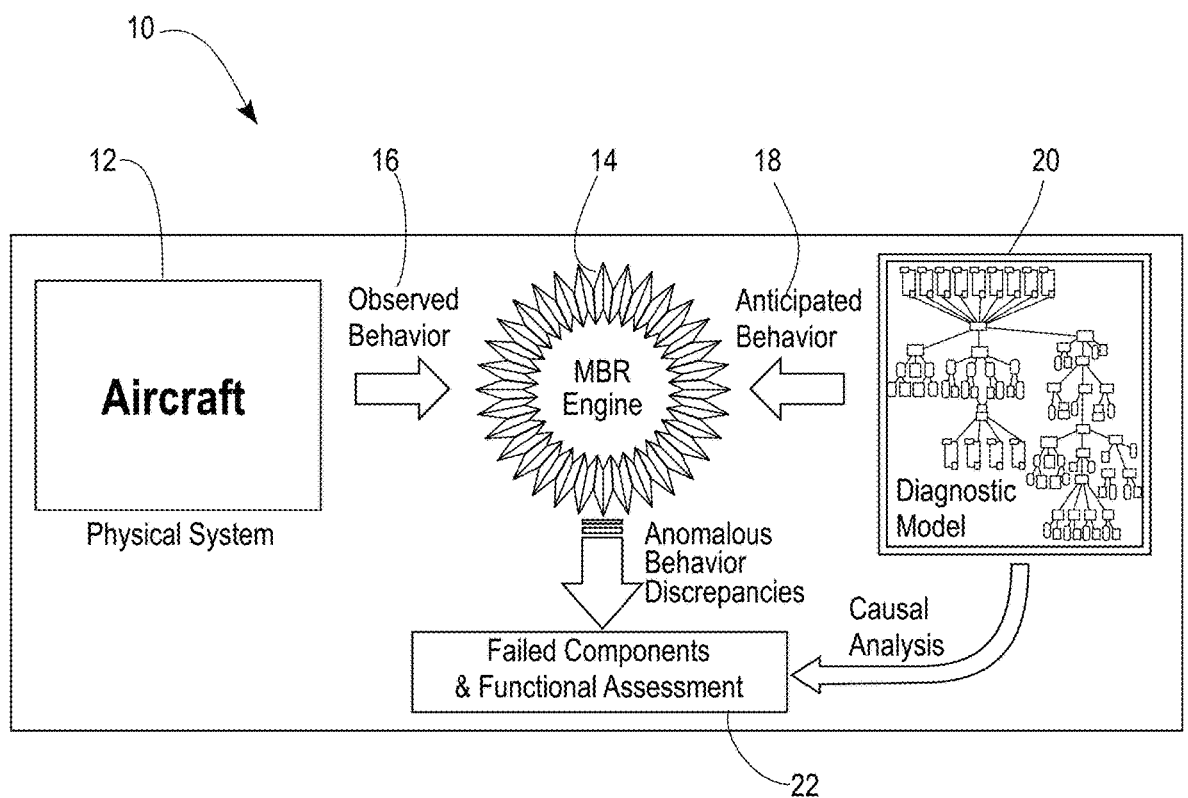
FIG. 1 shows a block diagram of an on-board operational IVHM system and its interfaces for diagnostic analysis of equipment failures in an aircraft.

FIG. 1 shows the functional behavior and interfaces of an IVHM (Integrated Vehicle Health Management) system 10 on aircraft 12 where MBR (Model Based Reasoner) Engine 14 runs on a computation device (not shown) in an avionics bay of aircraft 12. Although an aircraft is shown and discussed with reference to FIG. 1, embodiments are not limited to this type of vehicle. Observed behavior 16 refers to the sensor data in BIT (built in test), parametric, analog, and discretes obtained from various aircraft avionics data buses. Anticipated behavior 18 refers to what is expected from the modeled domain knowledge 20 of the various subsystems, line replaceable units (LRUs), and components of entire system (this model is represented in XML format). Component refers to subsystems, LRUs, and components. When observed behavior 16 is different from the anticipated behavior 18 anomalous behavior (discrepancies/residues) is registered and MBR Engine 14 goes into a diagnostics mode (causal analysis). With various reasoning algorithms and analysis of the BIT, parametric, and sensor data MBR Engine 14 produces results 22 that include detection of failed components; isolation to a single failed component or an ambiguity group of similar components; false alarm identification; functional assessment of the failed component (i.e., leakage in a pump, leakage in a pipe, blockage of air flow, bearing damage, and other assessments dependent on the physics of the component); and unknown anomalies. In case of an unknown anomaly, model 20 is refined with additional information on the component and its interactions with other components related to its failure modes. This information is obtained from the manufacturers of these components and additional failure modes are added to the existing model. To reduce the ambiguity group of similar elements in a chain (series or parallel), typically additional sensors are required to isolate to a specific component within the ambiguity group. If additional sensors cannot be applied due to size, weight, and power limitations the maintainer must perform off-board diagnostics analysis within the localized ambiguity group.

Figure 2:
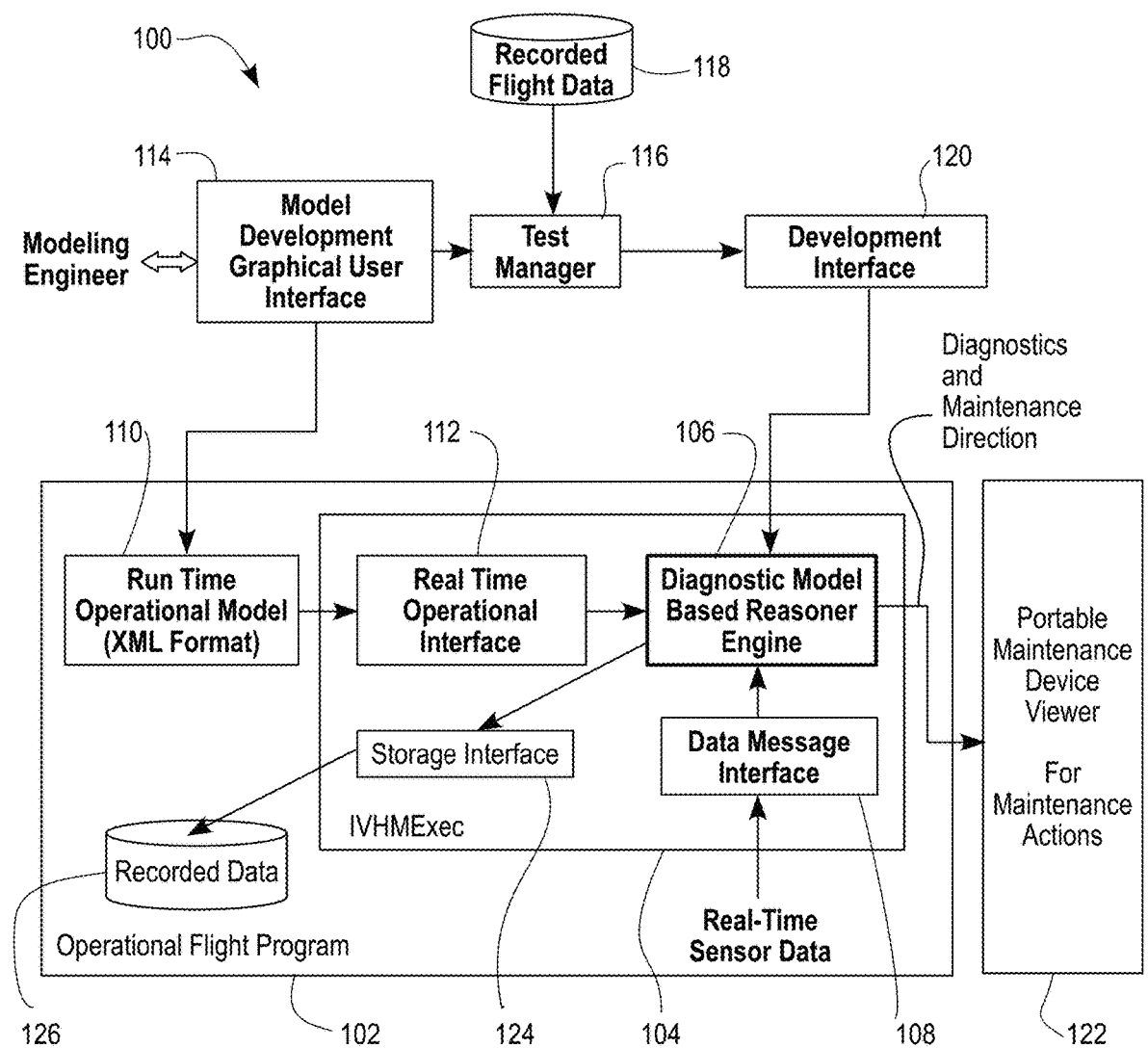
FIG. 2 shows a block diagram of design, operations, and maintenance processes & interfaces of the IVHM system.

FIG. 2 shows a block diagram of an IVHM system 100. The various components of FIG. 2 are linked together to logically combine their interconnected functions, failure modes, failure probabilities, and functional assessments in the modeled system, and also linked to sources of design (114, 116, 118, 120), real-time or post-processed input data distributed to the pilot's display (obtained from Operational Flight Program 102), ground systems (obtained from OFP 102), and storage on disk (126) for maintainer's on-ground maintenance actions 122. For discussion purposes, IVHM system 100 is represented as a block diagram but the functions and methods described maybe logically combined in hardware components in a variety of ways.

Operational Flight Program (OFP) 102 encompasses hardware and software for managing the overall operation of the vehicle. OFP 102 includes a runtime diagnostics engine IVHMExec 104. OFP 102 may also be implemented as a standalone avionics IVHM computer attached passively to the avionics data buses, actively interfaced with mission planning systems, and actively interfaced with ground systems and maintenance systems 122. IVHMExec 104 includes a diagnostic Model Based Reasoner (MBR) Engine 106. MBR Engine 106 combines a physical model of a vehicle system or subsystem with input data describing the system state, then performs deterministic inference reasoning to determine whether the system is operating normally, if any system anomalies exist, and if so, to isolate and identify the locations and types of faults and false alarms that exist. IVHMExec 104 writes maintenance records to a disk 126 that may also be accessed by Portable Maintenance Device Viewer 122.

MBR Engine 106 receives real-time sensor data through Data Message Interface 108 in which high-frequency and low-frequency sensor data are analyzed and integrated together to facilitate the decision-making by MBR engine 106. It also receives a Run Time Operational Model 110 of the vehicle through Real-Time Operational Interface 112. Model 110 of the vehicle is created by a modeling engineer using a Model Development Graphical User Interface (GUI) 114. Model 110 is created and verified with the MBR Engine 106 offline (non-real time) and then exported to an XML file that is used by a real-time embedded build of IVHMExec 104. In addition to creation of model 110, GUI 114 is also used to verify the model. Verification and validation are a test of the model's internal logic and elements, without the use of any specific input data. This process is necessary to ensure that the model is logically consistent, without errors that would prevent it from operating properly or not at all.

As a further step in the model development process, Test Manager 116 evaluates a model by testing it against simulated or actual flight data 118. Development Interface 120 allows for modification and addition of MBR Engine 106 algorithms, which are separate classes statically or dynamically linked to the IVHMExec 104 runtime executable (statically for standalone IVHMExec and dynamically for integration with the Graphical User Interfaces (GUIs)). While verification tests a model logically, Test Manager 116 ensures that the model performance and output is as desired. Once a model is verified and tested, an XML model configuration file 110 is generated.

IVHMExec 104 is the executive that loads the XML representation of the model and executes the MBR Engine 106 in real-time by applying the model to input sensor data messages as they are received from various buses in the vehicle and/or stored history data in various formats for replay on ground. IVHMExec 104 may also be used by Test Manager 116 through Development Interface 120. Storage interface 124 connects MBR Engine 106 to Recorded Data storage 126. Recorded Data 126 includes log files, complete time-stamped state of the equipment, for example, snapshots, time-stamped fault/failure anomalies, detections, isolations, and any functional assessments on the isolations. The log files also include the MBR Engine software states (version number, failures & reboots) as well as identification of other aircraft software, their version number, if failed their state at failure, reboots of software, and functional assessments that lead to the failure. Collection of this data allows for the replay of diagnostics visualization of the actual events that occurred on the aircrafts, and allows the maintainer to better understand both hardware and software interactions leading to the failed component(s). Recorded Data storage 126 stores the raw data used by the MBR Engine 106 and the results of its processing.

In an embodiment, MBR Engine 106 includes dynamically calibrated data input capability, and a set of logic gates (intersection AND, union OR, exclusive-or XOR, and others), rules, cases (histories), and decision trees combined in sensor logic for IVHM data fusion of parameterized and direct analog sensor data with corresponding Built-In-Test (BIT) inputs. A comparison of parametric data, direct analog sensor data, and BIT results produce confidence measures in failure and false alarm predictions.

An example of the creation of a model for use by MBR Engine 106 will now be described. In an embodiment, the model provides for data fusion from many sources within a modeled vehicle. In particular, the model may include parameterized data input capabilities that allow MBR Engine 106 to include analog and quantified digital data input, with either fixed or dynamically calibrated bounds to the measured physical quantities to determine the existence of anomalies. The parameterized data anomaly decision can be based on simple fixed bounds, dynamically changing calibration values based on physical sensor operations, or more complex decision properties including signal noise reduction, windowing, latency times and similar parameterized data conditioning. These data calibration parameters and thresholds become sensor node properties for evaluation during real time operations of the system. Functions can be represented as logic sets and operands while rules may be represented as logic sets or natural language semantics, historic behaviors (case based), or decision trees (fault tree analysis). For example, in the case of pressure functions, the model would evaluate whether flow pressure is provided and combine other inputs according to the function logic desired. In an embodiment, each input must indicate a positive result for the function to be evaluated as true although other logic functions may also be used. Various user-defined parameters for this function can be represented as node properties of the function. The XML MBR Model(s) 110 of the vehicle and the binary IVHMExec 104 real time engine running on an avionics computational device provide IVHM capability/functionality for the entire vehicle.

Figure 3:
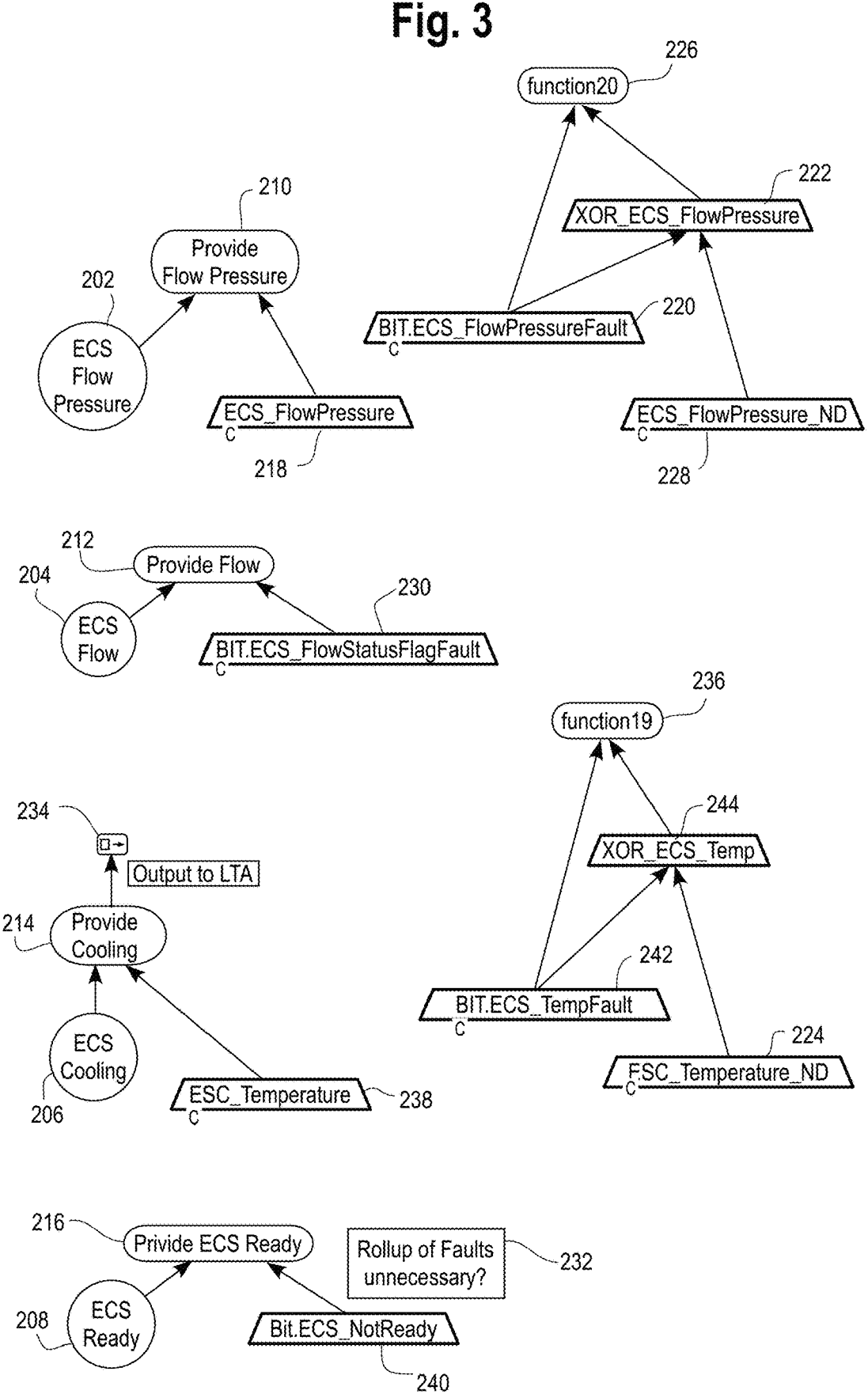
FIG. 3 shows a model of a subsystem for use with the IVHM system.

A parametric and BIT MBR model may include components and sensors that are related by their functions. In an embodiment, a model of a vehicle system or subsystem may be represented as nodes in a graph as shown in FIG. 3. In particular, FIG. 3 shows an example of an environment control subsystem (ECS) including both diagnostic or non-diagnostics nodes as it would be represented using the Model Development GUI 114 of FIG. 2. For the purposes of explanation, a specific example will be discussed, however, principles explained herein may be applied to any subsystem or system of a vehicle. A modeling engineer interacts with the model of FIG. 3 through the GUI 114 of FIG. 2.

Diagnostic nodes are used directly in the MBR model reasoning engine to determine the system components causing a fault or false alarm, while non-diagnostic nodes are used for tasks such as sensor output and BIT test comparison. The non-diagnostics nodes are used for real-time comparison of parametric sensor data with BIT data results. The parametric sensors represent the true system behavior (when the sensors have not failed), and if they are operating nominally when the BIT data show failure of corresponding components, this result is shown as a false alarm. Failed sensors are identified from false positive and false negative tests upon the sensors. Components, such as a Flow Pressure component, refer to a specific system element whose state (e.g. on, off, high or low pressure, etc.) and status (operational, failed, leaking, etc.) is indicated by MBR Engine 106, by connecting the component to other elements of the model. Sensor nodes are modeled with input data, which could take many forms, for example, direct sensor analog input, parametric data input and binary BIT data input. Referring to FIG. 3, a representative component node is shown as ECS Flow Pressure sensor node 202. Other component nodes include ECS Flow 204, ECS Cooling 206 and ECS Ready 208.

Figure 3A:
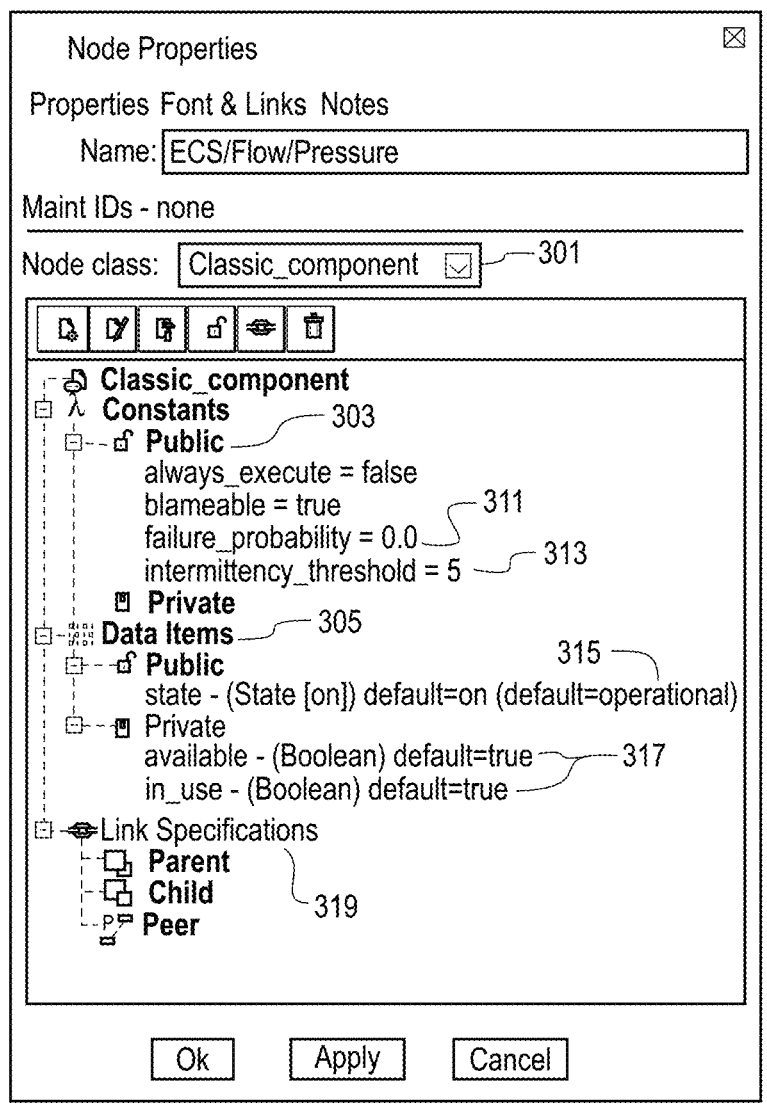
FIG. 3A shows a representation of a component in the model of FIG. 3.

FIG. 3A shows various user-defined parameters for node 202 may be seen by a modeling engineer by double-clicking on the function node icon, which brings up the window shown in FIG. 3A for node 202 (circle). The parameters defined in the Node Properties include the Node Class 301, default parameter values 303, and data items 305 defining the capabilities, output and status data types of node 202. Although specific labels and features are shown in FIG. 3A, these may be varied depending on the function being modeled and the design of a modeled vehicle.

In the default parameter values 303, 311 indicates a failure probability (failure modes) entered from a component supplier with a "0" indicating no supplier data available. Alternatively, the failure probability can be entered from historical performance data. It can be recalculated with degradation events, i.e. the failure probability increases with degradation events. The intermittency threshold 313 refers to a time period of intermittent or random behaviors with an exemplary default value of five seconds. The state 315 defines the various states of the component, e.g. ON, OFF, high-pressure, etc. The available and in use parameters 317 are shown as both being set to "true", i.e. the component is both available and in use. A "false" state in either of the parameters 317 could be due to failure and/or due to other reasons such as loss of power, etc. the link specification 319 specifies links to other components by function nodes.

Figure 4:
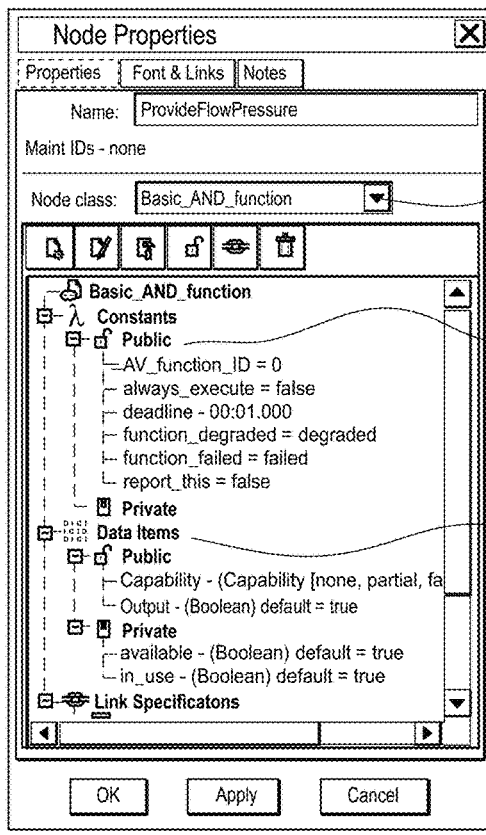
FIG. 4 shows a representation of a function node in the model of FIG. 3.

Another type of node in the model of FIG. 3 is a function node. A representative function node is shown as Provide Flow Pressure node 210. Other function nodes include Provide Flow 212, Provide Cooling 214 and Provide ECS Ready 216. Each of the function nodes in FIG. 3 represent a basic AND function. Provide Flow Pressure 210, for example, is used to determine if flow pressure is provided (logic sets and logic operands), combining other inputs according to the function logic desired. In this example, each input must indicate a positive result for the resulting state of the function to be true. Various user-defined parameters for function node 210 may be seen by a modeling engineer by double-clicking on the function node icon, which brings up the window shown in FIG. 4 for function node 210 (oval). The parameters defined in the Node Properties include the Node Class 302, default parameter values 304, and data items 306 defining the capabilities, output and status data types of node 210. Although specific labels and features are shown in FIG. 4, these may be varied depending on the function being modeled and the design of a modeled vehicle.

Figure 5:
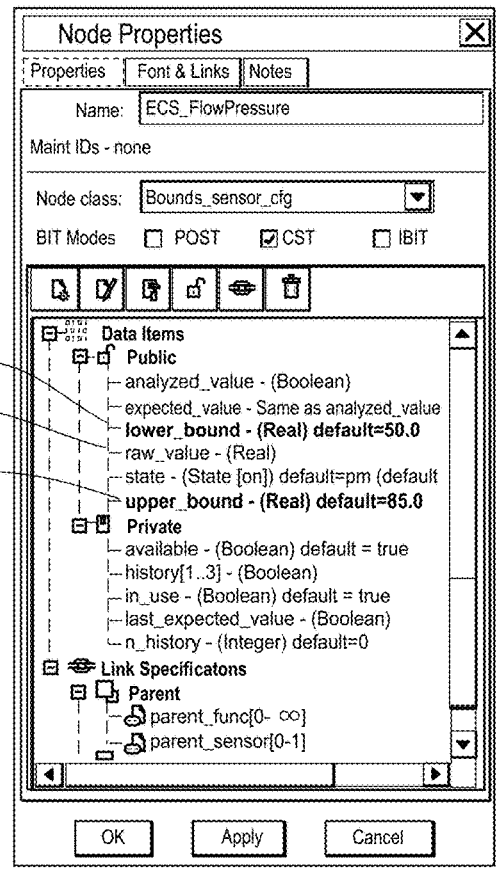
FIG. 5 shows a representation of a sensor node in the model of FIG. 3.

Another type of node in the model of FIG. 3 is a physical sensor node. A representative physical sensor node is shown as ECS_FlowPressure node 218 (trapezoid) in FIG. 3. Another physical sensor node is shown as ECS_Temperature node 238. Physical and virtual nodes are used in the model to indicate input data, which could take many forms. As described above, a modeling engineer interacts with the model of FIG. 3 through GUI 114. Various user-defined parameters for physical sensor node 218 may be seen by a modeling engineer by double-clicking on the node icon, which brings up the window shown in FIG. 5 for physical sensor node 218. For sensor node 218, parameterized input data is used with fixed upper and lower bounds (allowable thresholds) defined as defaults in the Node Properties window shown in FIG. 5. The use of parameterized data allows for direct analysis of quantified sensor values, listed in the sensor Node Properties as raw value 402 as seen in FIG. 5. In this case, the sensor raw value 402 contains the measured flow pressure for the ECS subsystem. If raw value 402 drops below the lower bound 404 or exceeds the upper bound 406, then the sensor indicates an anomaly, which is then used by MBR Engine 106 (FIG. 2) along with the rest of the model to determine the nature and cause of the anomaly (causal analysis FIG. 2).

Another example of a physical sensor node is BIT ECS_FlowPressureFault 220. This sensor uses Built-In-Test (BIT) data from the modeled system, which indicates either an anomaly or normal operation in the data output. This BIT test is designed to use the same upper and lower bounds as the corresponding parameterized sensor, but could produce a different result in the case of an anomalous operation. As such, we use the BIT test as an input along with a separate parameterized data input, into XOR_ECS_FlowPressure node 222 which is an exclusive logical or (XOR) sensor node. In some cases, only a BIT test sensor may be available to the maintainer; in this case, the BIT test will be used as a diagnostic sensor similar to the parametric sensor node used here for the ECS_Flow Pressure 218. Other physical sensor nodes in the model of FIG. 3 include BIT_ECS_NotReady node 240 and BIT_ECS_TempFault node 242.

XOR_ECS_FlowPressure node 222 receives inputs from physical sensor node BIT_ECS_FlowPressureFault 220 and ECS_FlowPressure_ND 228 (nondiagnostics), which is a parameterized input sensor node. The reason that a separate parameterized input sensor is used for the XOR input is because this input is non-diagnostic (no diagnostics cycle performed). Sensors can be either diagnostic, which means that they are used in the MBR engine to determine system faults and false alarms, or non-diagnostic to remove them from the MBR engine assessment. For XOR sensor input, a non-diagnostic parametric sensor input 228 is desirable to prevent interference with the MBR engine, as the XOR logic and output is complementary and separated from the MBR engine processing. In the example used here, the BIT test sensor 220 is also non-diagnostic, for the same reasons. In addition, for XOR sensors, a blank function 226 is used to fulfill a design requirement that each sensor has a downstream function attached to it. Another blank function is shown at 236. Similarly, to node 222, XOR_ECS_Temp node 244 receives input from physical sensor node BIT_ECS_TempFault 242 and parameterized sensor node ECS_Temperature_ND 224.

XOR_ECS_FlowPressure node 222 produces a separate output stream, only indicating a positive Boolean result when the connected sensors (the parameterized sensor node 228 and the corresponding BIT test node 220) provide different assessments. Under normal operating conditions this should not happen, therefore the XOR sensor node is useful to determine when one of the system's BIT or parameterized inputs is providing an anomalous result. This provides the modeler with another tool to diagnose the system's health, which may otherwise be difficult to analyze.

An example of a case where only a BIT test data field is available is shown in FIG. 3 as BIT_ECS_FlowStatusFlag-Fault node 230 which provides sensor input to Provide Flow node 212. In this case, the BIT test node 230 is diagnostic, and used in the MBR Engine directly. Other model element types seen in FIG. 3 include comments shown, for example, as 232, describing model functionality, and output icon 234 which allows for model elements outside (i.e., Outside submodel: "Output to LTA") of those shown in the sub-model shown in FIG. 3 to communicate with the sub-model, specifically the Provide Cooling function node 214.

Figure 6:
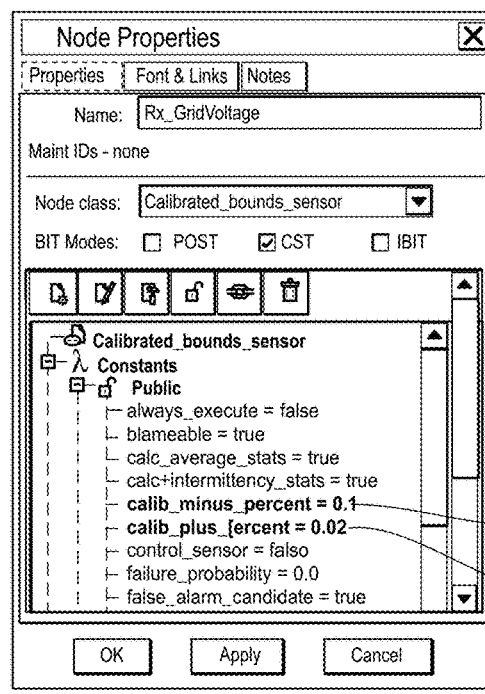
FIG. 6 shows a representation of a calibrated bounds sensor node in the model of FIG. 3.

In some cases, parametric nodes will not have fixed upper and lower bounds. In this case, a separate node class can be used, as shown, for example, in FIG. 6. This node is not part of the subsystem model of FIG. 3. Here, a second input is used which provides a calibration value (for example, a calibration voltage) which may vary over time. The measured value must then fall in a percentage range defined by calib_minus_percent 502 and calib_plus_percent 504 (generally determined from subsystem supplier information) around the calibration value. This type of sensor node can be used in place of Bounds_sensor_cfg class nodes, such as ECS_FlowPressure node 218 of FIGS. 3 and 5, when known calibration values for the limits of a parameterized sensor exist.

Figure 7:
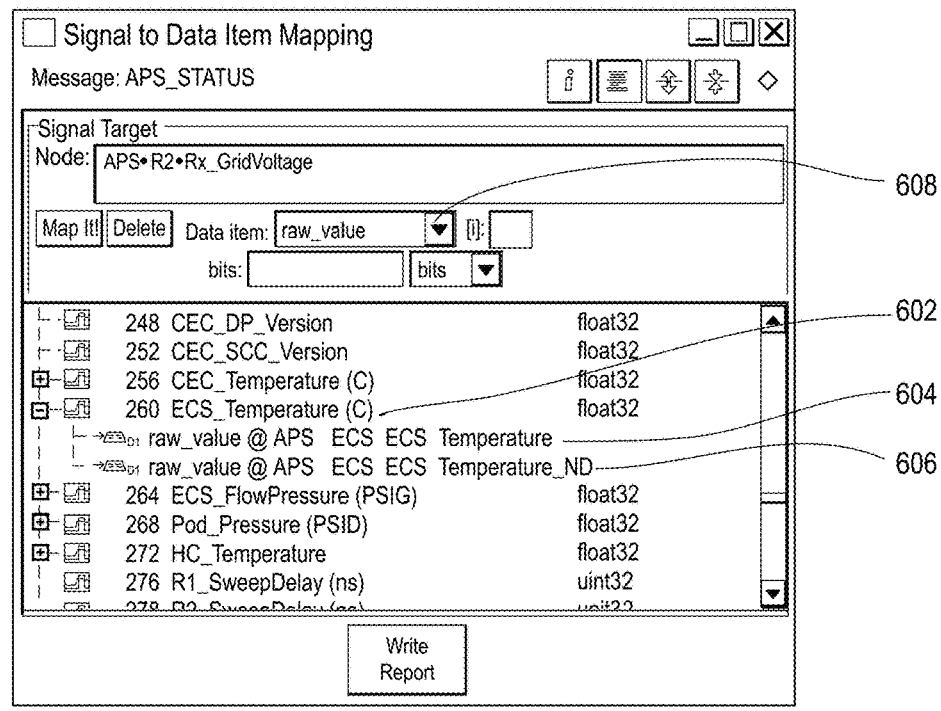
FIG. 7 shows a representation of a data mapping to sensor nodes.

In an embodiment, a model such as that shown in FIG. 3 includes a list of data fields corresponding to each element of the model. For example, as shown in FIG. 7, the ECS_Temperature (C) 602 value is mapped to the diagnostic ECS_Temperature sensor node 604 and non-diagnostic ECS_Temperature sensor node 606 in the ECS submodule. These are the labels of data columns in a file format used as data input for this model, and allow for all data fields for various sensors in each subsystem to be defined systematically in one file. Separate data items are mapped for BIT test data nodes, and calibration data items for calibrated sensor nodes. The raw value data item selection in the drop-down menu 608 indicates that this example data item is a raw measurement value from the ECS temperature sensor. Each sensor in the model (parametric or BIT) is mapped to a data item, along with any calibration value data sets for calibrated parametric sensors.

Figure 8:
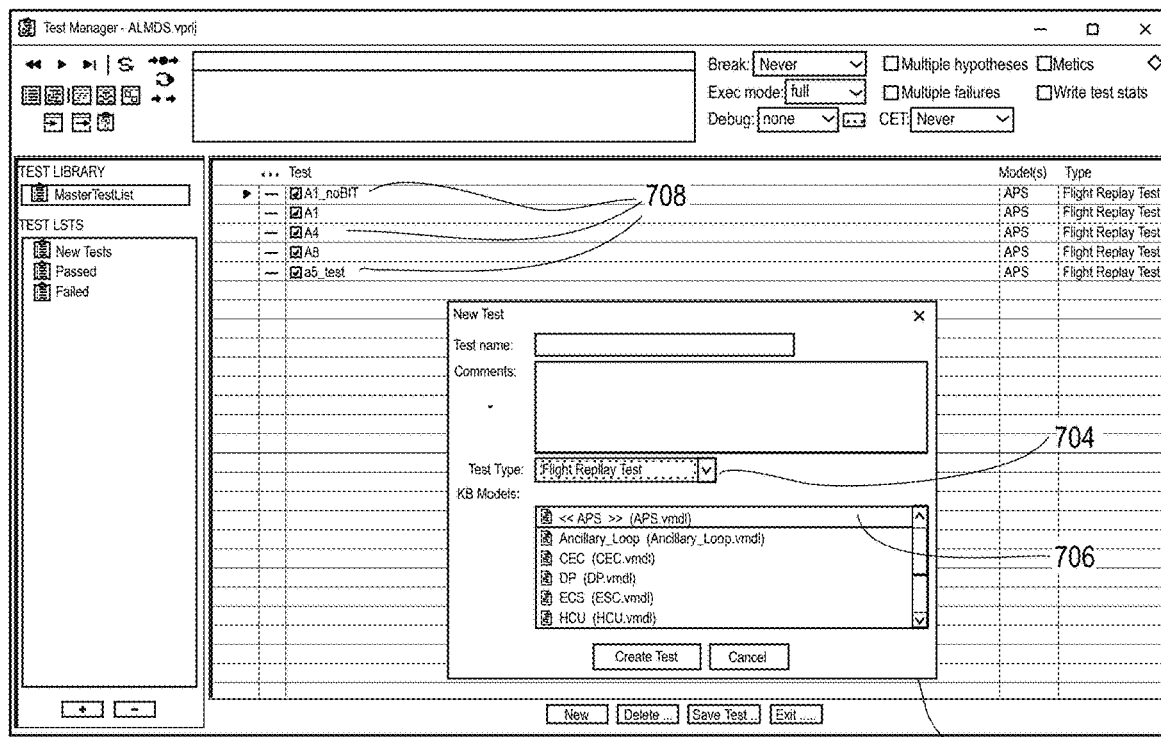
FIG. 8 shows a representation of a mechanism for testing a model for use with the IVHM system.
Figure 9:
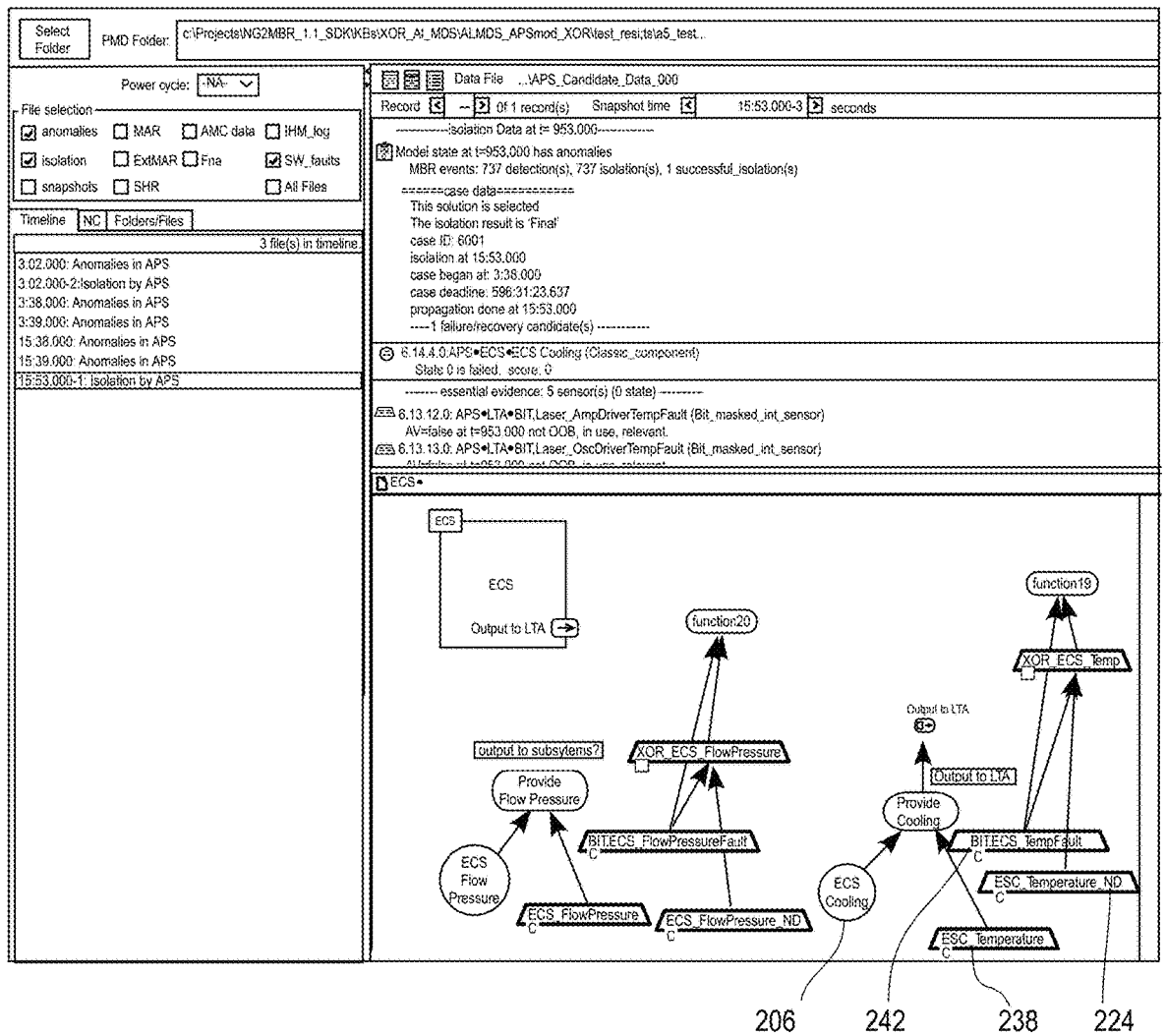
FIG. 9 shows an example of a fault analysis report.

Referring back to FIG. 2, after an IVHM MBR model is built using Model Development GUI 114 (with all sensors, components and functions in place to emulate the operations of each subsystem), there are two methods to run the model using real or simulated system data. As explained above, GUI 114 contains a direct method to run the MBR model using recorded flight data 118 with Test Manager 116. FIG. 8 shows a representative Test Manager window with a New Test pop-up window 702. When Flight Replay Test 704 is selected, a suitable test simulated data or actual flight data file can be selected from options 706 and loaded into Test Manager 116 in FIG. 2. After a test of the model is run using a data file, an output file is generated and can be viewed with subsequently stored analyzed diagnostics results written as maintenance records (i.e., the maintenance records storage 126 in FIG. 2). Other test cases with existing flight data already may be selected from those shown at 708. The specific tests shown in FIG. 9 are representative examples only, and many other tests may also be used.

In an alternative embodiment, a modeling engineer using GUI 114 (FIG. 2) may test a model using a Command Line standalone version of IVHMExec 104 (FIG. 2). For this procedure, an XML (Extensible Markup Language) file containing information about the model and data mapping is generated (i.e., the complete <<APS>> (APS.vmdl) model 706 in FIG. 8 from a different GUI screen not shown). This file can be run with the Command Line standalone version of IVHMExec 104 to generate the output file at a predefined storage location, which can be loaded in PMD data viewer 122 (FIG. 2). This result should be the identical as that generated in the Test Manager 116 (FIG. 2) for the same flight data, but the Command Line procedure allows for batch file processing of large quantities of data sets and varying numbers of system MBR models.

Figure 10:
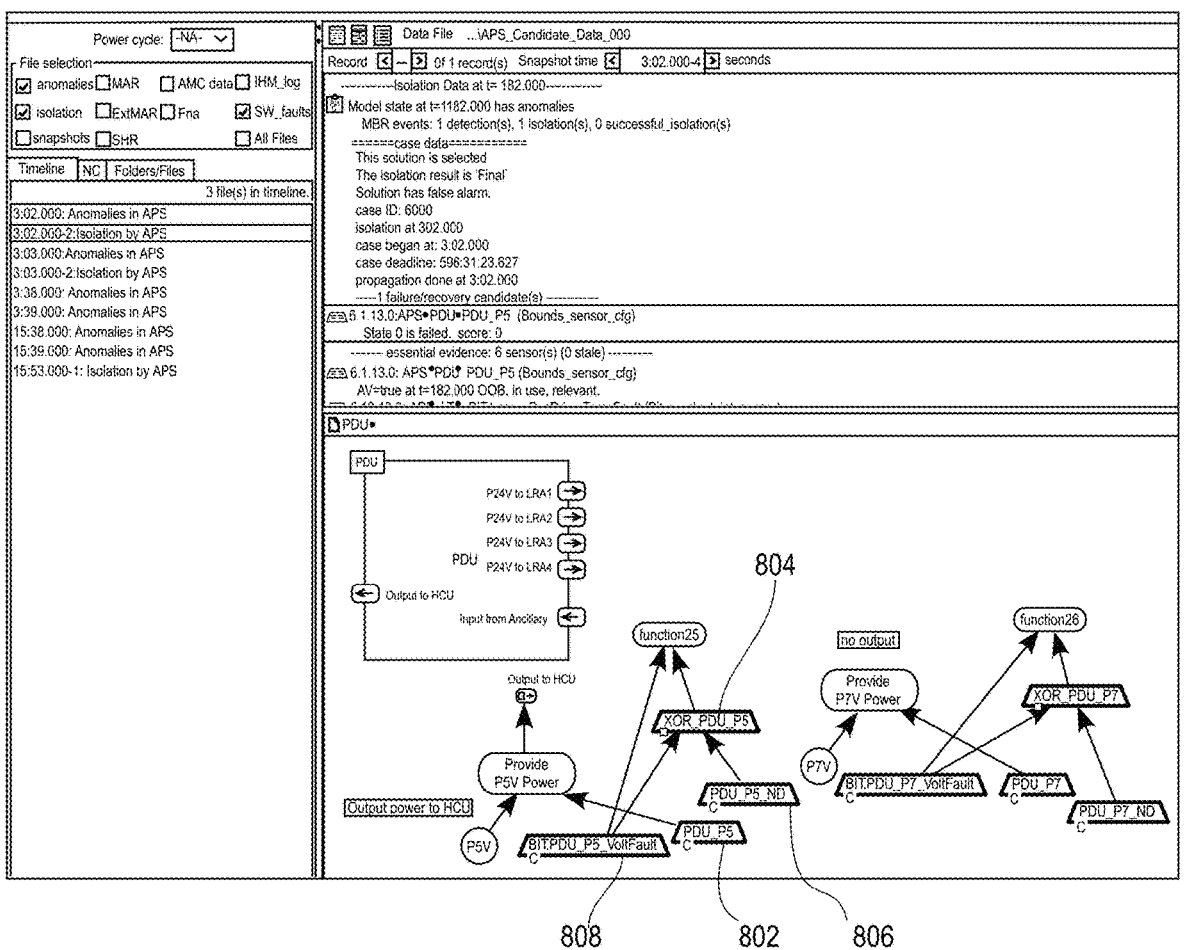
FIG. 10 shows an example of a false alarm report.

An example of output data from a model test is shown in FIG. 10 (PMD Viewer 122 FIG. 2). MBR Engine 106 (FIG. 2) has isolated a fault for the ECS Cooling component, using a fault in both the parameterized ECS_Temperature sensor represented as ECS_Temperature node 238 and supporting evidence in other subsystem components including other temperature sensors (in some of these cases, for example, an LTA Laser Amplifier Driver Temperature (not shown), the only data available is a BIT test, hence a BIT test node is used for supporting evidence in this case). The logic of the interconnected subsystems' sub-models as similarly shown in FIGS. 2 and 10 dictates this result when the parameterized sensor ECS_Temperature node 238 measuring the ECS temperature is determined to be an anomaly with appropriate supporting evidence (from other sensor internal to subsystem or external sensors from other subsystem models). In addition, the BIT test BIT.ECS_TempFault node 242 measuring the ECS_Temperature anomaly is separately indicating a fault; this sensor node is non-diagnostic and therefore not used to determine system faults, but it is used as a comparator for the non-diagnostic ECS_Temperature_ND parametric sensor node 224. Variations between the BIT and parametric nodes can indicate a faulty BIT test or sensor, and are one of the capabilities added by implementing parameterized sensors.

FIG. 10 shows an example of an output of MBR Engine 106 generating a False Alarm. In this case the Power Distribution Unit (PDU) P5V sensor 802, a parametric sensor measuring voltage in a PDU sub-model a system, is generating an anomaly because the data input for this subsystem is out of the defined parametric range. A parametric sensor node implementation allows for direct use of this sensor data, bypassing potentially troublesome hardware BIT test results. Parameterized nodes also allow analysis of quantitative data directly for calculation of confidence measures, windowing the data for spurious data points, and similar analysis. In this sub-model, a comparator analysis using XOR_PDU_P5 node 804 between the parametric node PDU_P5_ND 806 and BIT test data from BIT_PDU_P5_VoltFault 808 is made to determine if there are any discrepancies between these two results which would be indicative of a sensor or BIT test failure. In the example below, the anomaly is determined to be a False Alarm since other subsystems would expect a similar anomaly in the case of an actual fault in the system hardware. As no such other anomaly exists, the MBR Engine 106 is able to determine that this anomaly is a False Alarm (outcome listed in the top right box of FIG. 10). The other lines shown below this box and above the graphics are timestamped supporting evidence in the outcome of FIG. 10.

The central purpose of the invention is to produce High Fidelity Real Time Diagnostics capability (False Alarm (FA) rejections, Fault Detection (FD), Fault Isolation (FI), and parameter trending for equipment failures) for vehicles and other systems, but is especially (but not exclusively) suited for aircraft. This invention provides embedded software diagnostics capability on numerous hardware devices and operating systems, and system avionics integration for determining the health of the system during in-flight real-time system operations. By implementing parametric data input from high-frequency and low-frequency sensors and XOR parametric-BIT comparator fusion, the system has the capability to analyze quantitative sensor input, develop sophisticated fault and false alarm confidence measures, and identify and analyze BIT failures while maintaining valid system health management and diagnostic capabilities.

Figure 11:
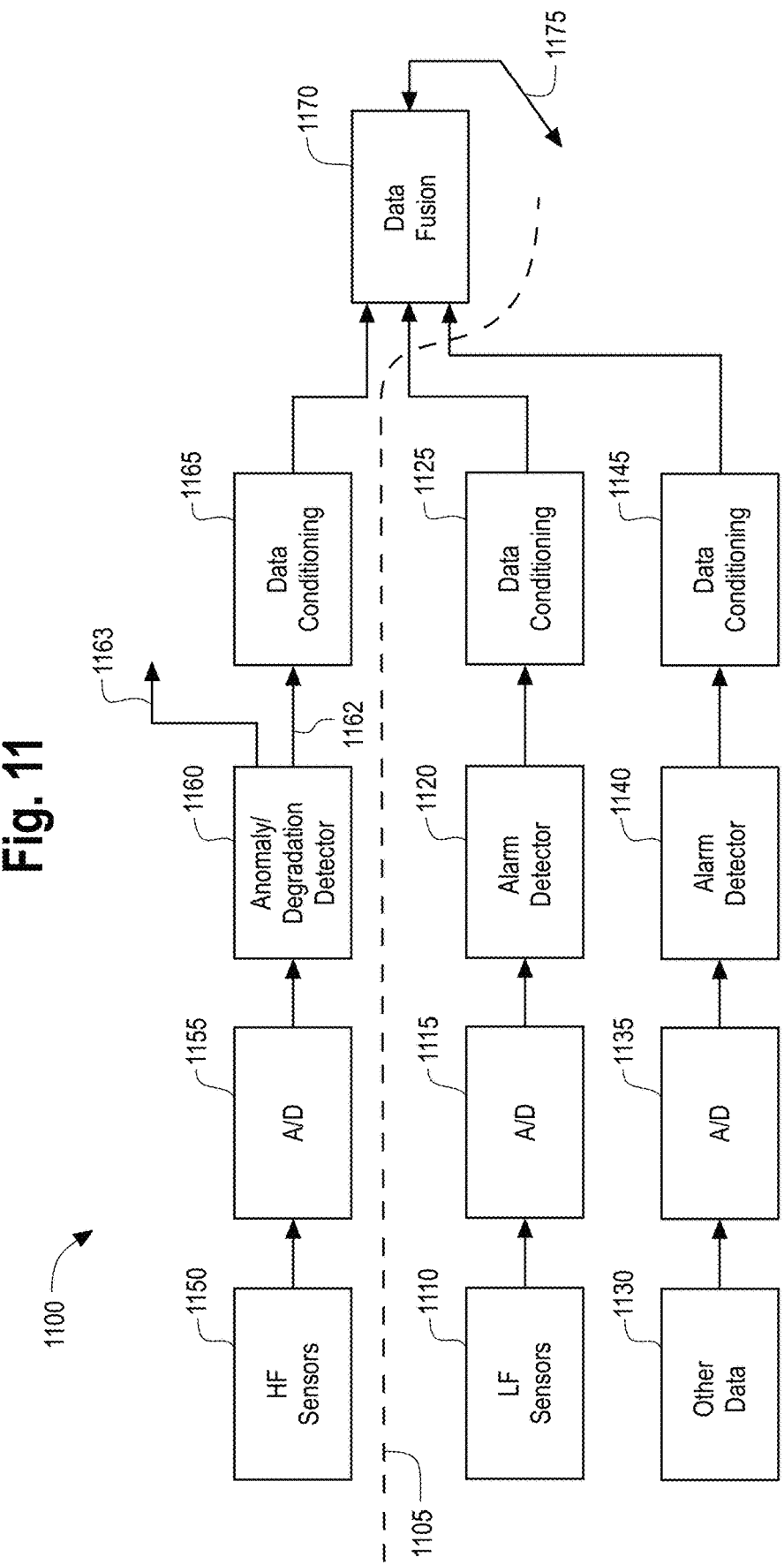
FIG. 11 is a block diagram of an embodiment of the Data Message Interface in which high-frequency and low-frequency sensor data is processed and integrated.

FIG. 11 is a block diagram of an embodiment 1100 of the Data Message Interface 108 (FIG. 2) in which both high-frequency and low-frequency sensor data are processed and integrated together. The dashed line 1105 separates the high-frequency sensor data processing components shown above the line 1105 from the low-frequency sensor data processing components shown below the line. The low-frequency sensor data processing represents a conventional approach. Low-frequency sensors 1110 provide a relatively low data rate output and may be associated with sensors for pressure, temperature, volume, flow, voltage, current, etc. Such sensor output is typically associated with an analog voltage which is converted into a digital signal by the analog-to-digital converter (A/D) 1115. Of course, if a direct digital output is provided by the sensor, it does not need to be processed by the A/D converter 1115.

The digital signal representations of the sensor outputs are supplied as inputs to the alarm detector 1120 which functions to make a determination of whether an alarm condition exists. Such a determination is based on a comparison of whether the digital value of the sensor output is within a fixed window of values defined by static, stored, upper and lower threshold values associated with each respective sensor. Such a comparison can be made by a microprocessor comparing the sensor value with the corresponding threshold values, or could be made by dedicated circuitry, e.g. integrated circuit comparators. If the value of the sensor output is within the respective window, the functioning of the component's parameter being sensed is determined to be within an acceptable range, i.e. no alarm condition. If the value of the sensor output is outside the respective window, functioning of the parameter is determined to be not within an acceptable range, i.e. an alarm is needed. If a sensor window is relatively wide (low and high threshold values are far apart), an extreme or unusual, but abnormal, operating condition may cause the parameter being sensed to exceed such a window and thereby cause alarm. This corresponds to a false positive. The wide window allows for most signals to register as alarms, especially noisy signals, while the system may be functioning properly. This is generally the case in pre-flight testing when components and sensors are achieving normal steady state. The time internal for steady state can be up 30 minutes for certain systems such as Radars. As steady state is achieved false alarms are significantly reduced. Current methods require a long schedule and budget to achieve an understanding of remaining false alarms and an acceptable static lower and upper threshold for each sensor. Our MBR Engine implementation reduces this effort and budget by 90% within two test flights. True False Alarms are easily identified. True Faults can then be worked upon for maintenance (repair or replacement). Persistent false positives (above upper threshold) are an indication that the corresponding sensor has failed. A zero sensor raw value represents an electrical short circuit in the sensor. If the sensor window is set to relatively narrow (low and high threshold values closer together) to accommodate a sensor output corresponding to extreme or unusual operating conditions so as to minimize false alarms, there is a risk that the parameter being sensed may be operating with an unacceptable characteristic that will not be determined to be an anomaly/alarm condition because the sensor output lies outside the narrow window. This corresponds to a false negative. False negatives indicate that possible real anomalies have missed alarm registration and tagging that would otherwise be processed in the detection cycle for causal analysis. Hence, there are challenges in establishing a window with fixed upper and lower threshold values.

The output from the alarm detector 1120 consists of the input digital sensor values with respective digital tags indicating alarm or no alarm. This provides an input to data conditioning 1125 which provides data formatting and alignment. Since the digital output from different sensors may have a different number of digits or may have different ways of encoding values, data formatting converts these values into standardized data representations and formats (i.e., floats, integers, binary bits, etc.), as well as padding of digits of data as necessary. Also, because the sensor data rate (frequency) will typically differ for different sensors, converting each sensor data stream into a data stream having a common data rate, e.g. 50 Hz, makes it easier to integrate and process the information from such a variety of sensors and data branches. The data conditioning 1125 can be implemented on a microprocessor which can make formatting changes to provide conformity of the expression of the sensor values, and can also utilize a common clock to establish time synchronized signals into a single common data rate for the respective digital sensor outputs which may require either up-sampling or down-sampling of each sensor data stream to convert it to the target common data rate, e.g. 50 Hz.

The other data 1130 represents other information obtained from sensors or monitoring such as hardware and software BIT, system fault codes, warnings, cautions, advisories, meteorological, and biological (heart rate, etc. of the vehicle operator, e.g. pilot) data. Signals associated with this information are further processed by the A/D converter 1135, alarm detector 1140, and data conditioning 1145 which perform similar functions as explained above for the corresponding A/D converter 1115, alarm detector 1120, and data conditioning 1125, respectively.

The high-frequency sensors 1150 provide high data rate analog information and may for example include sensors such as, stress gauges, strain gauges, accelerometers, vibration sensors, transducers, torque gauges, acoustics sensors, optical sensors, etc. Such sensor outputs are converted to a digital signal representation by A/D converter 1155 and are input to the anomaly/degradation detector 1160 (see FIG. 12 and text for a more detailed description) in which functions to make determinations of whether each of the sensor data streams represents an anomaly and/or degradation condition is made. If one or both such conditions are determined to exist for a sensor value, the corresponding digital sensor data is output with embedded flag indication at output 1162 which contains real-time sensor information at a down sampled sensor date rate. Output 1163 is a raw output of the digital sensor data for all the sensors, but after having been down sampled to reduce the amount of data associated with each sensor. This output 1163 contains data for all sensors but at a down sampled (substantially lower) data rate and is intended to be utilized by additional real time processors (not shown) to provide diagnostic health determinations. The down sampled data is more manageable (smaller in size requiring less memory for storage) and easier to process, as compared to processing all of the real time sensor data and reduces the time and processing capability required for processors that perform the real time diagnostic health determinations. The data conditioning 1165 operates similarly to data conditioning 1125, except that it must process substantially more sensor data per unit of time since the high frequency sensors will typically produce orders of magnitude more data than the low frequency sensors in the same time interval. The format used by all of the data conditioners accommodates the incorporation of a flag for anomaly or degradation condition, or alarm status.

The data fusion module 1170 (see FIG. 13 for a more detailed description) maps the incoming sensor data streams within a moving time window into groups of sensor data that are correlated, i.e. where the sensor data for each sensor within one group has a mutual relationship in which a component anomaly or failure sensed by data from one sensor in the group should also be reflected by an anomaly or failure as indicated by data from other sensors in the group. For example, assume a first group consists of sensor data associated with sensors that sense the vibration of a pump, the electrical power utilized by the pump, and the flow rate produced by the pump. Also assume that the pump is suffering a degradation due to worn bearings. If the bearings are sufficiently worn, the pump will generate vibrations outside the norm; electrical power utilized by the pump may increase or have a spike in power demand at start-up due to increased friction in the worn bearings. The sensor data associated with the flow rate produced by the pump may or may not show a reduced flow outside of the norm depending upon the severity of the degradation as the pump motor tries to compensate with increased load (power) increasing the pump shaft rotation while maintaining the required flow. Eventually if this is allowed to continue the pump components will fail with torn bearings, shaft misalignment, and possibly burnt motor wire windings.

A consistency of sensor data indicating out of norm conditions from more than one sensor in a sensor group is a step in identifying the presence of an actual degradation or failure. The actual failure isolation is determined by the MBR Engine algorithms 106 (FIG. 2) when compared to the MBR model 20 (FIG. 1). Conversely, data from one sensor indicating an out of norm condition that is not verified by sensor data from another sensor in the group also indicating an out of norm condition is possibly a false alarm which may result from a temporary anomaly (random or intermittent) or that a persistent sensor out of norm condition indicates that the sensor is itself not functioning properly.

Sensor data associated with other upstream or downstream components can also be included within a group. In the above pump example, assume that the pump is controlled to produce a flow of liquid that is channeled through a component, e.g. an engine that requires cooling. In this further example a heat sensor associated with the engine could be included within the group since a failure of the pump would also likely produce an increased engine heating that could exceed a desired operational range. Thus, it will be understood that the grouping of sensor data that are correlated can be associated with the sensed attributes for more than one component. A group of sensor data may include sensor information from a high-frequency sensor 1150, a low-frequency sensor 1110, and/or other data sensors 1130. Of course, the data from some sensors may not be included in any group and hence will be analyzed and considered individually.

The data fusion module 1170 analyzes the mapped sensor data within a time window that increments over time, either on a group basis for the sensor data included within a predetermined group of correlated sensors or on an individual basis where sensor data is not part of any group. The data fusion module 1170 makes a determination based on stored usage and operational norm information for each group/individual of sensor data of whether a tag should be associated with the group/individual sensor data, where the tag consists of one of a predetermined set of conditional codes. Each conditional code is mapped to and compared to similar fault code generated by the component. The conditional codes are then transmitted for further processing in MBR Engine 106 (FIG. 2), while the fault codes and conditional codes are stored in non-volatile memory. For example, a conditional code of "0" indicates the sensed attributes of a component are within a normal range of operation; a "1" represents a component anomaly/failure; "2" represents a detected false positive that could be caused by the normal range of operation window for the sensor being so wide as to include an undesired operational condition; "3" represents a detected false negative that could be caused by a sensor failure or too narrow a window of normal range calibration for the sensor such that real anomaly supporting evidence misses the MBR Engine 106 detection cycle.

The sensor data along with the conditional codes are transmitted from the data fusion module 1170 to the diagnostic model-based reasoner engine 106 for further analysis. The data fusion module 1170 is implemented in software that runs on a microprocessor/computer capable of mapping the sensor data streams into correlated groups, comparing the respective sensor values against a dynamic normal window of operation having an upper and lower threshold, determining if an anomaly/fault associated with one sensor in a group is supported by a correlation of an anomaly/fault by another sensor in the group, and encoding the respective sensor data with an error code tag representative of the malfunction/fault determined.

Figure 12:
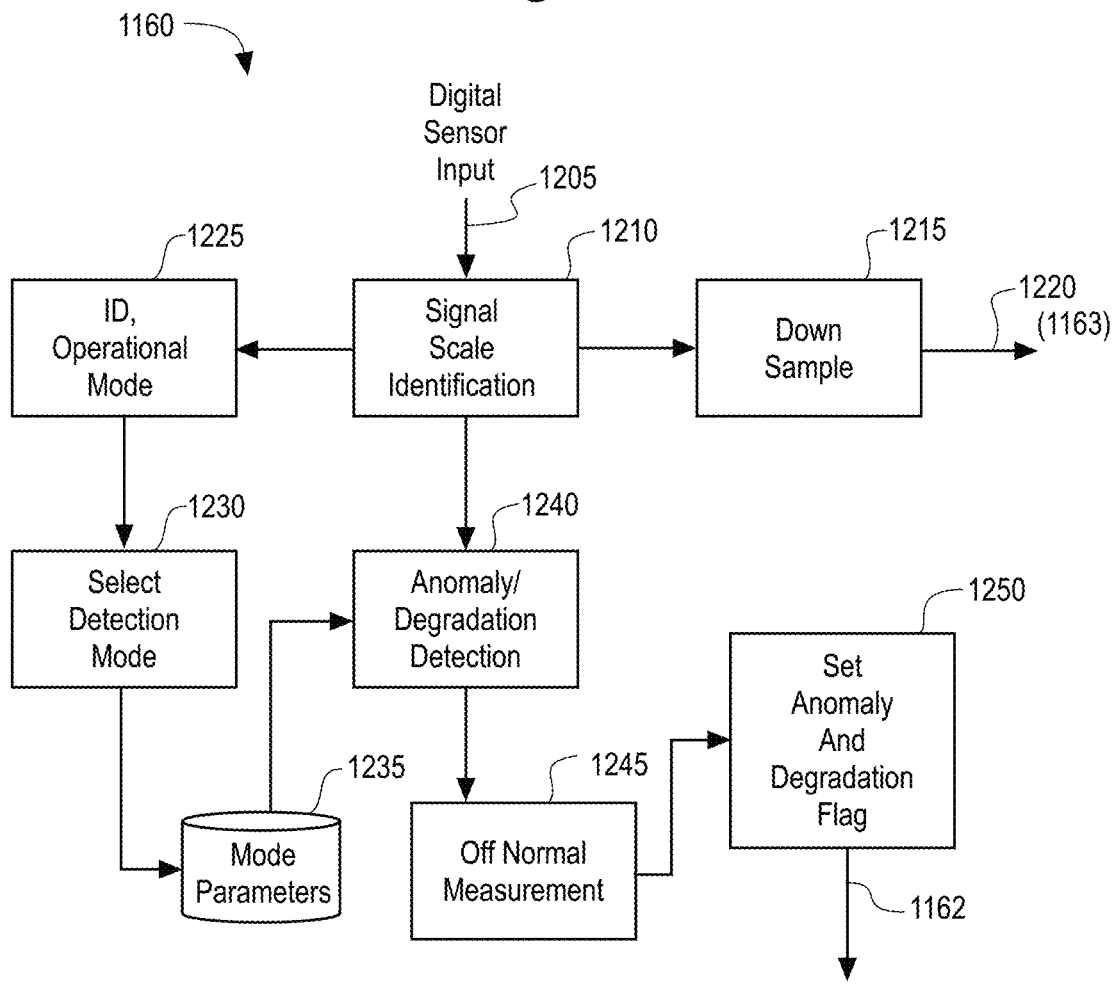
FIG. 12 is a block diagram of an embodiment of the anomaly and degradation detector of FIG. 11.

FIG. 12 is a block diagram of an embodiment of the anomaly and degradation detector 1160 of FIG. 11. This detector is preferably implemented by software running on Graphical Processing Units (GPU) such as on a system-on-a-chip that has hundreds, if not thousands, of GPU processor cores available for processing. This supports the concurrent processing of the outputs from a large number of sensors. Although the A/D converters may utilize dedicated hardware circuits, the A/D converters may also be implemented in software utilizing GPU cores. Likewise, the data conditioning module 1165 may also be implemented by software running on the GPU cores. The digital sensor inputs 1205 from the A/D converter 1155 are received as inputs by the signal scale identification module 1210 which receives the parametric values from the sensors in a dynamic/moving window of valid values and thresholds. The dynamic window of valid values is established based on historical stored normal data for the operation of the vehicle with which the sensors are associated. The raw sensor data received by the signal scale identification block 1210 is passed to the down sample module 1215 which reduces the size of the sensor data stream by eliminating substantially normal data (keeping a small amount time-stamped normal data with number of deleted duplicate data represented by this data sample). Representative out of norm parameter data are tagged with a timestamp and the number of deleted duplicate data represented by this data sample. This down sampled data stream transmitted on output 1220 allows for the re-creation of the initial data stream for non-real time off-line analysis. The identification of operational mode block 1225 analyzes the sensor data and compares it to different stored historical value ranges associated with corresponding different modes of operation of the vehicle, e.g. pre-flight, taxi, take-off, acceleration and deceleration, loitering, weapons delivery, landing, post-flight; to name a few of the modes. The select detection mode block 1230 receives an output from the identification of operational mode block 1225 which identifies a mode of operation of the vehicle. The select detection mode block 1230 causes mode parameters 1235 to identify a corresponding stored set of parameters (upper and lower thresholds, and other mode dependent factors) for each sensor that defines a normal window of anticipated values unique to that operational mode.

These parameters are transmitted to the anomaly/degradation detection module 1240 which utilizes the corresponding parameters for each sensor data stream to identify values that lie outside of the anticipated operational norms defined by these parameters. Thus, dynamic windows of normalized operation for each sensor varies depending on the mode of operation. This provides a dynamic change of normal parameters for each sensor based upon the mode of operation and thus allows a more accurate determination of whether an anomaly/degradation is being sensed because the corresponding "normal value windows" can be changed to allow for values anticipated during a specific mode of operation. Because sensor values can vary considerably depending upon the mode of operation, tailoring window thresholds and parameters for the respective modes of operation greatly enhances the ability to eliminate false alarms without having to utilize a single large acceptable range to cover all modes of operation. Off-line training based on collected and stored previous sensor data for various modes of operation allows for refinement of these window threshold values.

The off normal measurement module 1245 receives the respective sensor data from the anomaly/degradation detection module 1240. Module 1245 makes parameter distance measurements of the values associated with each sensor output relative to normal parameter values for the determined mode of operation. Based on these parameter distance measurements, the off normal measurement module 1245 makes a determination for each sensor output of whether the function being sensed by the sensor is operating within a normal mode or if an anomaly exists. If the sensor output value falls within the corresponding normal value window, a normal operation is determined, i.e. the function is operating within anticipated range of operation. If the sensor output falls outside the corresponding normal value window, and anomaly of operation is determined, i.e. the function is operating with degraded performance or failure, or problem with the sensor or its calibration exists. Refer to the tag conditional codes as explained above. Such a tag is applied to each sensor output and transmitted to the set anomaly and degradation flag module 1250. Module 1250 incorporates such a tag with each of the sensor output values which are transmitted as outputs 1162 to the data conditioning module 1165.

Figure 13:
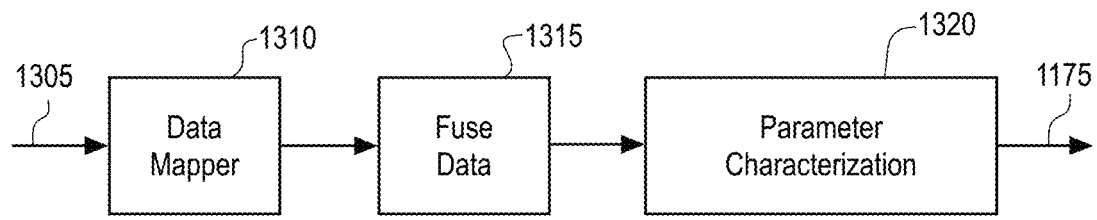
FIG. 13 is a block diagram of an embodiment of the data fusion module as shown in FIG. 11.

FIG. 13 is a block diagram of an embodiment of the data fusion module 1170 as shown in FIG. 11. The fusion module 1170 may be implemented by software running on a microprocessor-based computer. A data mapper module 1310 receives incoming streams of sensor data 1305 from data conditioning modules 1125, 1145 and 1165. This module maps or correlates the data from the incoming sensor streams so that the data from different sensors that are correlated, as explained above, are integrated into respective groups within a moving time window. That is, as the time window moves, sensor outputs occurring within that time window are those to be mapped into correlated groups. Since the incoming sensor data has been standardized to a common data rate, the time within each time window can be selected to capture one data output for each sensor. Since the sensors that will be supplying data are known in advance and groups of sensors that are correlated can be manually predetermined, the correlation information (sets of sensors that are correlated) to can be stored in memory and utilized to route the respect of sensor outputs by the data mapper into respective correlated groups. These groups of correlated sensor outputs are input to fuse data module 1315 which analyzes the data for a correlated group of sensor outputs, including sensor outputs in the group determined to be degraded/anomalous, against a stored set of initial performance parameters for the corresponding group of correlated sensors. The fuse data module 1315 fuses or integrates the data for a correlated group of sensor outputs into a single data set that is tagged with conditional fault or anomaly codes to assist in further analysis provided by the diagnostic model based reasonor engine 106. The fused output data from the fuse data module 1315 is an input to the parameter characterization module 1320 which compares the data associated with each correlated group of sensor outputs with outputs from single sensors that are part of the respective correlated group of sensors. This comparison preferably utilizes the corresponding outputs from single sensors from a past or last state. Such a comparison with a past output sensor state is useful for showing and predicting future states that may indicate off-normal behaviors or at least trending towards off-normal behaviors. The results of such comparisons are stored in a queue and then output as an organized set as outputs 1175 to the MBR engine 106 for further analysis. The queue allows for variable data rate output to accommodate any processing latency required in the MBR Engine 106, while managing the input data rates 1175 without loss of data (by dynamically allocating more processor RAM for queue as needed and releasing the allocated RAM when not needed).

Figure 14:
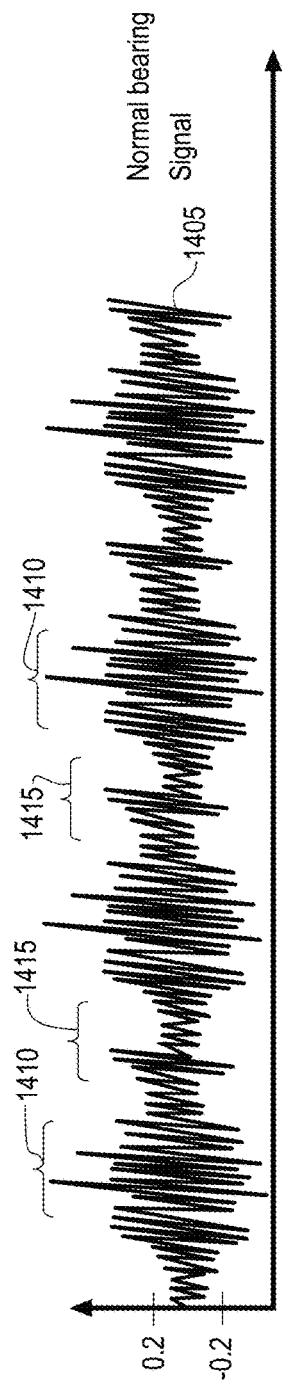
FIGS. 14 and 15 show exemplary high-frequency sensor data from a vibration sensor for motor bearings in a centrifugal pump showing representative sensor data corresponding to normal and defective pump bearings.
Figure 15:
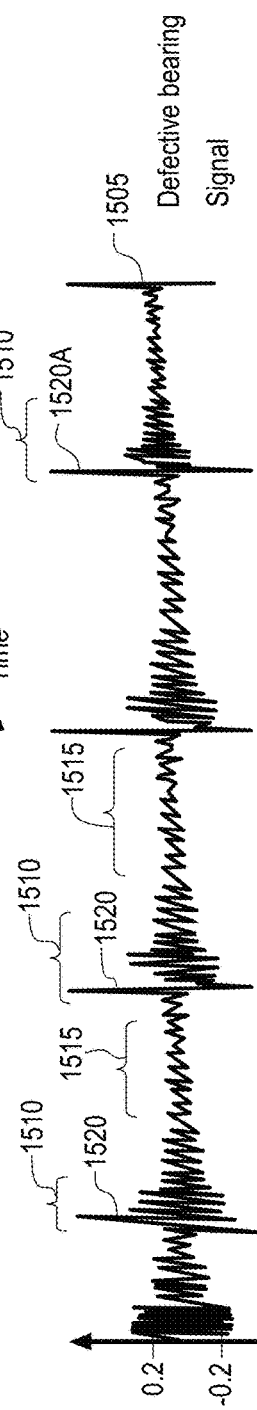

FIGS. 14 and 15 show exemplary high-frequency sensor data 1405 and 1505 from a vibration sensor for motor bearings in a centrifugal pump for corresponding normal and defective pump bearings, respectively. The sensor output data 1405 represents vibrations from a normally operating bearing in the pump and shows repetitive amplitude variations 1410 with the larger amplitudes corresponding to states of the pump which normally give rise to slightly larger vibrations smaller amplitude variations 1415 corresponding to states of the pump that produce less vibrations. The larger amplitude variations 1410 will typically correspond to pump states in which a greater load due to compensation for fluid backflow in the impeller housing or a change in load is occurring with the smaller amplitude variations 1415 corresponding to no fluid backflow, which produces less vibrations. Both 1410 and 1415 represent steady state operation of the centrifugal pump. Note that the rotor (pump shaft) velocity remains constant over the entire shown time interval.

Sensor output data 1505 represents vibrations from a malfunctioning/defective bearing in a pump. Somewhat similar to the variations in FIG. 14, there are repetitive larger amplitude outputs 1510 interspersed with smaller amplitude outputs 1515. However, it will be noted that the difference between the average of the smaller amplitude outputs and the average larger amplitude outputs is significantly greater in FIG. 15 then the same corresponding differences in FIG. 14. Also, an amplitude spike 1520 at the beginning of the larger amplitude output sections 1510 has a significantly higher amplitude than any of the remainder of the larger amplitude output section 1510. As time goes on, it will be noted that spike 1520A is even more exaggerated in its amplitude difference relative to the remainder of the corresponding larger amplitude section 1510. Such a vibration differential at the beginning of a pump cycle may correspond to increased friction due to worn bearings. Note also the baseline trend of the system to higher frequencies over time (e.g. increasing average slope from the start). This is an indication of the onset of degradation and misalignment of the pump shaft, and possible ultimate failure of the pump, unless repaired.

Once sensor data has been collected and stored corresponding to the normal anticipated bearing vibrations during the operation of a pump in good working order, this data can be compared/contrasted with sensor data during an in-service operation (in-flight for an aircraft) to make a determination of whether the subject pump is operating normally or is in need of maintenance or replacement. As explained below with regard to FIGS. 16 and 17, such a determination will preferably be made on the basis of information obtained from more than one sense parameter.

Figure 16:
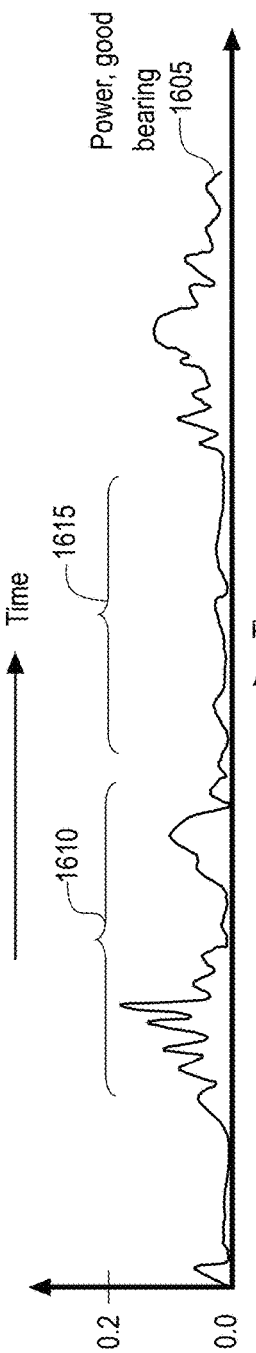
FIGS. 16 and 17 show exemplary high-frequency sensor data from a sensor that monitors electrical power to the centrifugal pump corresponding to power associated with a good bearing and a bad bearing, respectively.
Figure 17:
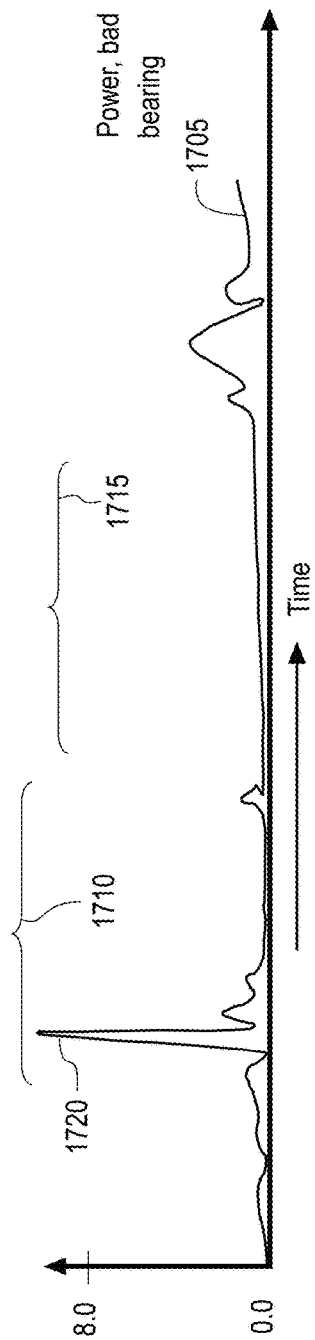

FIGS. 16 and 17 show exemplary high-frequency sensor data 1605 and 1705 from sensors that monitor electrical power to the centrifugal pump with a good bearing and a bad bearing, respectively. The sensor output data 1605 corresponding to power consumed by the pump with good bearings includes a larger magnitude section 1610 of relatively higher power consumption in the lower magnitude section 1615 with relatively low power consumption. It should be noted that the timescale in FIGS. 16 and 17 are the same but are different from the timescale associated with FIGS. 14 and 15. For example, the larger amplitude section 1610 may correspond to a time in which the pump is operational and under load with the lower magnitude section 1615 corresponding to a time interval with a lighter load or perhaps almost no load. Sensor output data 1705 corresponds to power consumed by the pump with bad bearings and includes a larger magnitude section 1710 representing higher power consumption relative to the lower power consumption as indicated by time interval 1715. However, the spike 1720 from the sensor of power being consumed represents more than an order of magnitude greater than the highest power consumption indicated during corresponding time interval 1610. Such an extreme large need for power consumption is consistent with an initial starting of the pump (or of a pump cycle) with a bad bearing where the bad bearing causes an especially high initial resistance to get the rotating part of the pump in motion.

The fusion of the data from the pump vibration sensor with the pump power sensor leads to a high reliability determination of whether the bearing of the pump is malfunctioning/degrading. Positive correlation by both a defective bearing signal 1505 and the power sensor data 1705 results in a highly reliable determination that the associated pump, at a minimum, needs maintenance or perhaps replacement. Conversely, without a positive correlation from two or more sensor signals, it is possible that only one sensor signal indicating a defect could be a false positive. Such a false positive could be the result of a temporary condition, such as a temporary change in operation of the vehicle or transient electrical interference. Alternatively, a lack of positive correlation could also indicate the sensor associated with the detection of the malfunction being itself defective or perhaps going out of calibration.

Figure 18:
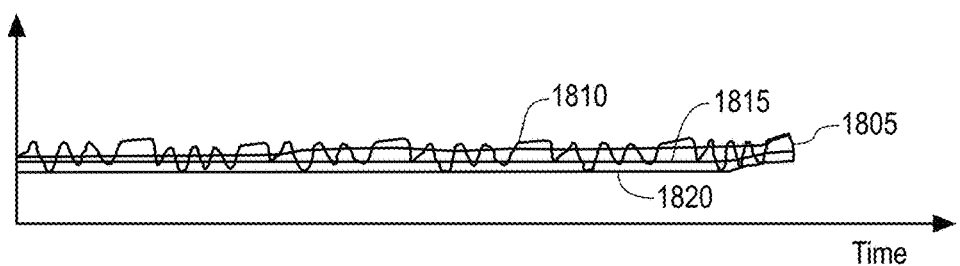
FIGS. 18, 19, 20 and 21 are exemplary graphs showing high-frequency sensor signals and derived sensor signal averages utilized for dynamic anomaly recognition.

FIGS. 18, 19, 20 and 21 are exemplary graphs showing high-frequency sensor signals and derived sensor signal averages utilized for dynamic anomaly recognition. This technique is independent of and performed in addition to the operation-based mode of processing, but both occur in parallel in Anomaly/Degradation Detection 1160. Only parameter anomaly tags with other information described below are forwarded to the Data Fusion 1170. It should be noted that timescale (horizontal axis) for these graphs are not the same as these graphs are presented to assist in explaining how different moving averages are utilized for dynamic anomaly recognition. In FIG. 18 the output 1805 from a high-frequency sensor forms the basis for a series of three different moving averages with respective short, medium and long timescale durations. In this example, the shorter timescale average 1810 is substantially shorter than the medium timescale average 1815 which is shorter than the long timescale average 1820. Timescale durations refers to the number of sensor data values utilized to calculate corresponding short, medium and long moving averages. The number of values may vary depending on the sensor data rate and the typical rate of change of sensor values. On initial data acquisition, these moving averages are dynamically set according to incoming parameter values and their rate of change in amplitudes. Medium moving average timescale duration is generally observed to be 1.5 to 2.5 times the short moving average timescale duration. The long moving average timescale duration is generally observed to be twice as large (or larger) as the medium moving average timescale duration. Note that the larger timescale duration sizes for medium and long moving averages has the effect of decreasing the magnitude (amplitude) in the resultant curves of these averages. These moving average sampling windows may be refined with off-line training on previous sensor data. These can then be statically set once enough confidence is gained on their applicability, thus reducing the computational processing power which can then be utilized for other processes. As shown in FIG. 18, the substantially consistent average magnitude of sensor output is reflected by corresponding substantially straight line short, medium and long moving averages 1810, 1815 and 1820, respectively.

Figure 19:
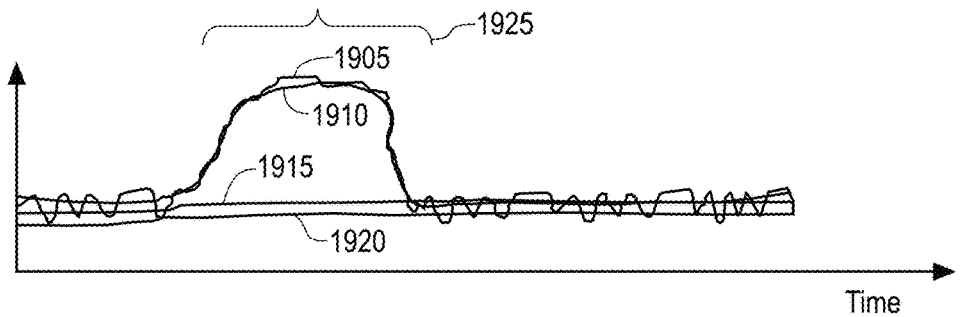

FIG. 19 shows the output 1905 for a high-frequency sensor with associated short, medium and long moving averages 1910, 1915 and 1920, respectively. In this example, there has been a substantial magnitude amplitude, short duration transient during interval 1925. Short term moving average 1910 closely tracks the sensor signal 1905 during this transient interval. However, a medium length moving average 1915 and the longer term moving average 1920 have a timescale that causes little variation of these averages during the transient interval, as shown. Such a transient could reflect a temporary (intermittent or transient) anomaly that is short relative to the moving average time interval associated with even the medium length moving average 1915. These can occur due random noise in the data due to noisy data busses, environmental effects, or some other near-neighbor mechanistic effect. This behavior is also known as a non-persistent shift in the moving averages, thus indicating a random statistical fluctuation in the signal.

Figure 20:
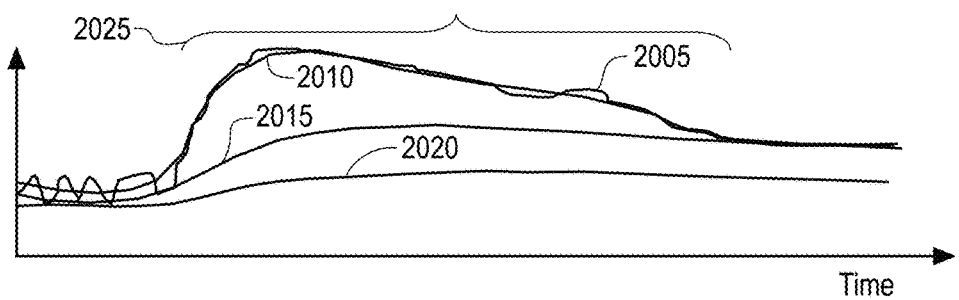

FIG. 20 shows the output 2005 for a high-frequency sensor with associated short, medium and long moving averages 2010, 2015 and 2020, respectively. This example illustrates a substantial initial magnitude change of sensor output values starting at the interval 2025. Although the initial magnitude change of the sensor output decreases by the end of interval 2025, it is still maintained at a level significantly higher than that proceeding interval 2025 (i.e., increasing slope of the baseline curve). As will be seen, the short term moving average 2010 closely tracks the sensor output values before, during and after interval 2025. However, the duration of the interval 2025 is substantially longer than the number of values used for the medium moving average 2015 such that the medium moving average 2015 begins to track towards the short term moving average 2010 so that these two moving averages substantially coincide at the end of interval 2025. Although the long moving average 2020 is slowly moving upward towards the medium moving average 2015 during the interval 2025, it will be noted that by the end of interval 2025 the long moving average 2020 has still not reached the value of the medium moving average 2015. Although the long moving average 2020 will eventually converge with the medium moving average 2015 (assuming the sensor output value remains a relative constant at the end of the interval 2025), it will take a substantial number of moving average rollover calculations for this to occur depending upon the difference between the number of sensor values utilized in the medium and long moving averages. The fact that the baseline slope is slowly increasing during large samplings (large number of sequential moving average calculations) of the parameter values indicates an off-nominal behavior, i.e., a persistent-shift in the moving averages (note in all curves). This is registered (tagged) as an anomaly as well as a degradation event in the corresponding parameter data. The component corresponding to these moving averages has not failed and can still be used but is in a degraded state (i.e., the operating conditions must be adjusted to lower values in order to attain steady state). At some point in the near future, however, this component may be repaired or replaced for full normal performance of the component.

Figure 21:
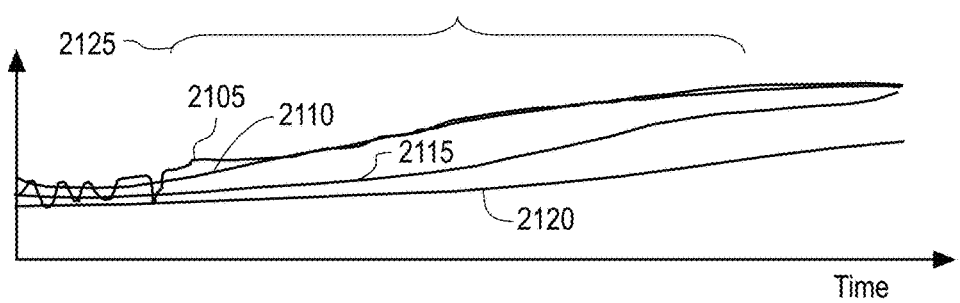

FIG. 21 shows the output 2105 for a high-frequency sensor with associated short, medium and long moving averages 2110, 2115 and 2120, respectively. In this example, the sensor output value 2105, beginning at interval 2125, undergoes a steady rate of increase in values until it reaches a substantially off-nominal value at the end of interval 2125. As expected, the short moving average 2110 closely tracks the values of the underlying sensor values 2105. The medium length moving average 2115 (medium sampling window) begins to climb towards the short moving average 2110 but does not reach the value of the short term moving average 2110 until after the end of interval 2125. As expected, the long moving average 2120 slowly begins to move upward towards the medium moving average 2115 but, by the end of the graph as shown, has not reached the same value as the medium moving average 2115. This example illustrates a persistent change (persistent shift in moving averages) of sensor output values moving from values shown prior to interval 2125 to new relatively off-nominal moving averages at the end of interval 2125. This example illustrates a near-failing component. It must be repaired or replaced very soon, i.e. preferably upon return of associated vehicle to a depot. The baseline slope is increasing continuously without a downturn and sharply. If this is a critical component, vehicle safety is comprised if vehicle operations continue as is. The operator of the vehicle should return to base. The parameter data is tagged as a critical anomaly (for a critical component) with an alarm that will be processed immediately by the MBR engine 106 and information displayed to pilot or transmitted to ground based pilot (assuming the vehicle is an aircraft) for immediate action.

Figure 22:
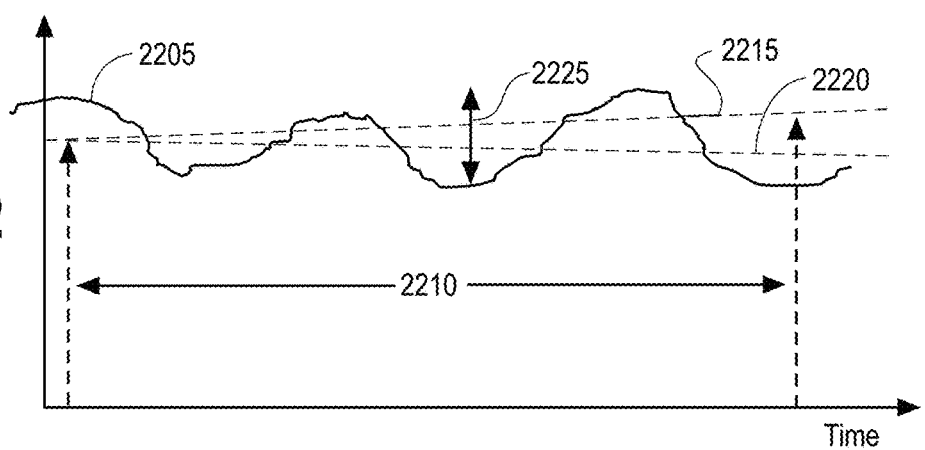
FIG. 22 is an exemplary graph of a high-frequency sensor signal with derived mathematical functions also utilized for dynamic anomaly recognition.

FIG. 22 is an exemplary graph of high-frequency sensor values from which is derived criteria that is utilized to assist in dynamic anomaly recognition. This exemplary graph provides a visual representation showing criteria determined over a moving data window 2210 based on the underlying sensor values 2205. These criteria provide a standard for determining whether an alarm should be implemented for the corresponding function sensed by the associated sensor values. Line 2215 represents the slope (s) of the data values contained within the window 2210. Line 2220 represents the arithmetic mean (u) of the data values contained within the window 2210. The vertical line 2225 is a visual representation of the standard deviation (SD) for the data values contained within the window 2210. Generally, an alarm should be set when:

$$|s| < 0.0167$$

and $$SD/u < 1/6$$

This technique accommodates the verification of persistent shifts in sensor output values as well as determining alarm coefficients, i.e. when alarm should be determined. The technique is based on a low probability with Gaussian Distribution statistics of determining a consistence value greater than six standard deviations, as normalized by the mean. It will be noted that the standard deviation is normalized by the mean to accommodate different sensor output values. In comparison with FIGS. 18-21, it is noted that normalized signals with moving mean averages (FIG. 22) produce smaller slopes "s" for persistent shifts in moving averages, and smaller values in SD/u. This produces the necessary conditions (as given above) for generating alarms.

Figure 23:
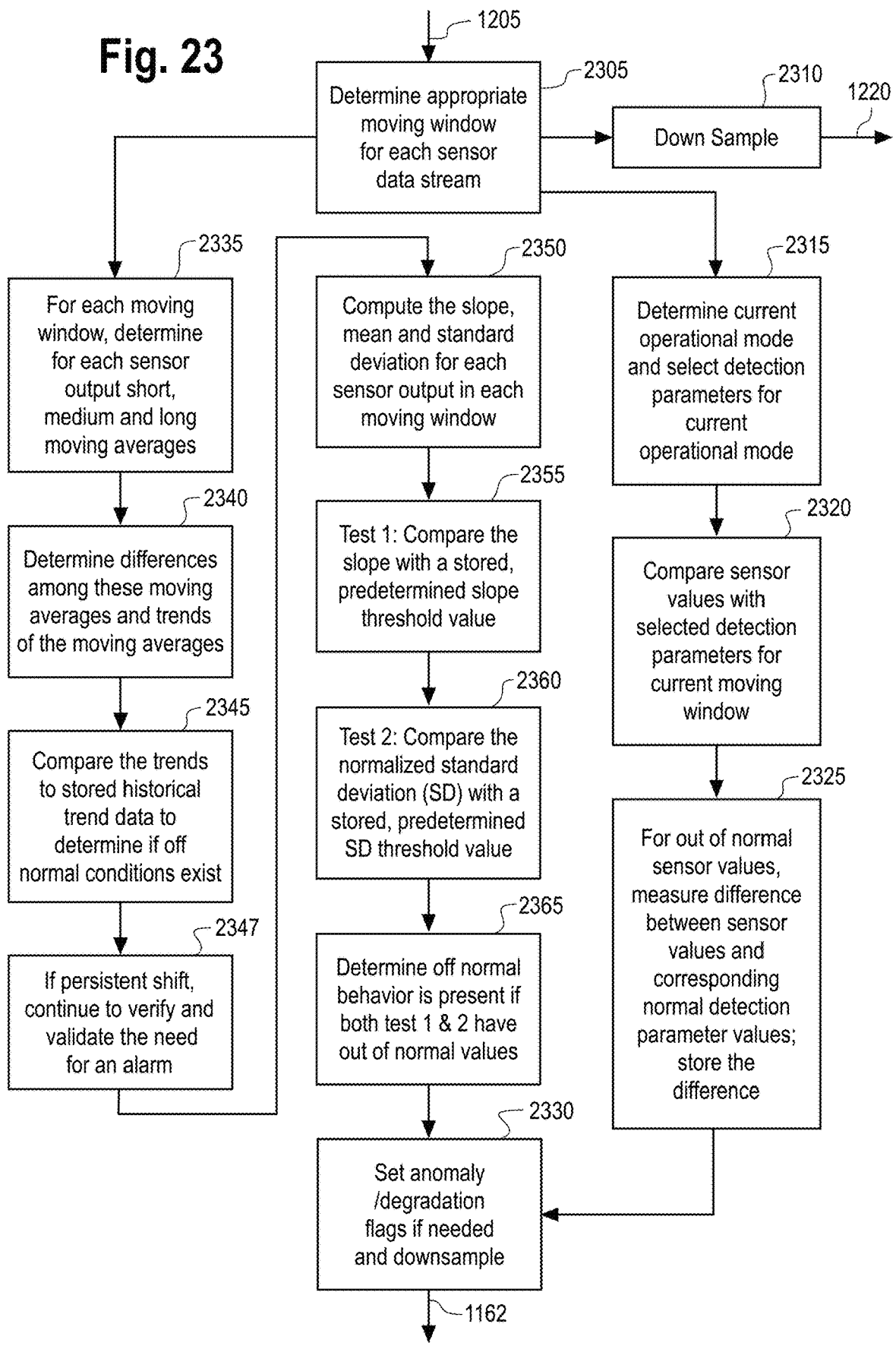
FIG. 23 is a flow diagram of exemplary steps that can be utilized to implement the anomaly/degradation detector of FIG. 12.

FIG. 23 shows a flow diagram of exemplary independent and parallel steps that can be utilized to implement the anomaly/degradation detection of FIG. 11. The stream 1205 of digital outputs from the sensors is received as an input to step 2305 which determines an appropriate moving window for the data associated with each sensor. Each of the sensors will be outputting data at a fixed data rate although the output data rates for the various sensors may be different. Since the output data for each sensor is uniquely identified for that sensor, a known data rate for each sensor can be stored in memory and then retrieved to assist in determining an appropriate moving data window, i.e. the number of sensor output values to be grouped together to form a series for analysis. Following step 2305, the digital sensor data stream is down sampled at step 2310 to minimize the quantity of data transmitted on output 1220. Often, when an anomaly is flagged, the same anomaly will be present over a series of moving data windows. The down sampling can consist of counting the number of consecutive moving data windows that each have the same anomaly for a given sensor output and then encoding the counted number of data frames/windows with the data associated with the last of the consecutive moving data windows with the same anomaly so that the original data can be reconstituted if desired by merely replicating the associated data of the counted number of times. This procedure is also utilized for nominal data to reduce its output size. It is anticipated that this information will be used in both real time for prediction of a future state/value of the component and in a non-real time environment such as for maintenance analysis performed at a maintenance location. The output 1220 may be transmitted such as wirelessly to the ground control station and/or maintenance location or may be stored locally in non-volatile storage and later transferred from storage to the maintenance location or retrieved from vehicle by a connected hand held device running the PMD Viewer.

In step 2315 a determination is made of the current operational mode and corresponding stored parameters for the operation mode are selected. For an aircraft, the current operational mode could be takeoff, normal acceleration, combat acceleration, cruising in the steady-state speed, landing, etc. this information can be determined such as from a flight plan stored in memory or from analysis of the sensor data that reflect the mode of operation, e.g. weight on wheels, accelerometers, speed, rate of change of altitude, etc. Stored predetermined criteria/thresholds for such sensor data can be utilized to determine the mode of operation when compared with the current sensor tags. Detection parameters, e.g. upper and lower threshold values, or stored normal values for the determined mode of operation, associated with particular modes of operation are selected. Each of multiple anomaly detectors 1160 is connected to a set of identical existing high frequency sensors (from 1 to n sensors) in the component and implemented in one core of the GPU. Alternatively, multiple anomaly detectors 1160 can be executed in the same GPU core for different sensors from similar or differing components. The sensor thresholds and calibration information are available from supplier data and stored on the vehicle for processing against real time input vehicle data. There are sufficient GPU cores that can be used for each high frequency sensor in the vehicle.

In step 2320 the current sensor values are compared with the selected detection parameters for a current moving window. With actual measurements (real time input signal), these selected detection parameters conform to nominal operation of the component to which the sensor is attached. An artificial neural network (ANN) with input, hidden, and output layers with backward propagation may be utilized as the anomaly detection mechanism. Stored training data is organized into groups of classes and is utilized in supervisory capacity (off-line supervised learning). An n-dimension Gaussian function can be utilized for modeling each class. These are also referred to as radial basis functions (RBF). They capture the statistical properties and dimensional inter-relationships between the input and the output layers. The algorithmic goal of the RBF ANNs is the output parameter "0" for nominal component behavior and "1" for an off-nominal component behavior.

In step 2325, for an output of normal sensor value, e.g. an anomaly, the difference between the sensor values and the corresponding normal detection parameters is calculated and stored. This information is useful in off-line training of sensor data and RBF function model refinement. In step 2330, data flags/tags are set, if needed, for corresponding sensor data.

In step 2335 determination is made of a short, medium and long moving averages for the output of each sensor for each moving window. The computation of moving averages is well understood by those skilled in the art will have no trouble implementing such calculations and software. In step 2340 a determination of the differences among these moving averages is made as well as the trends of the moving averages. In step 2345 the determined trends are compared to stored historical trend data to determine if off normal conditions exist. If a persistent shift (determined by discussion above) exists per step 2347, the process continues with verification and validating of the need for an alarm flag and sends corresponding sensor data to 2350.

In step 2350 the slope, mean and standard deviation for each sensor output in each moving window is computed. One of ordinary skill in the art will know how to implement such calculations in software either using a standard microprocessing unit or using an arithmetic processing unit. These calculations can also be implemented on a graphical processing unit. In step 2355 a 'test 1' is made where the slope is compared with a stored predetermined slope threshold value to determine if an off normal condition exists. In step 2360 a 'test 2' is made where the normalized standard deviation is compared with a stored predetermined standard deviation threshold value to determine if an off normal condition exists. In step 2365 off normal behavior is determined to be present if both 'test 1 and 2' have out of normal values. If needed, anomaly/degradation flags are set in step 2330 following step 2365. Also, in step 2330, the high-frequency sensor data is down sampled in order to have substantially the same data rate as the data rate received from the low-frequency sensors and the other data sensors. This facilitates easier processing and integration of the sensor data from all the sources by the data fusion block 1170.

Figure 24:
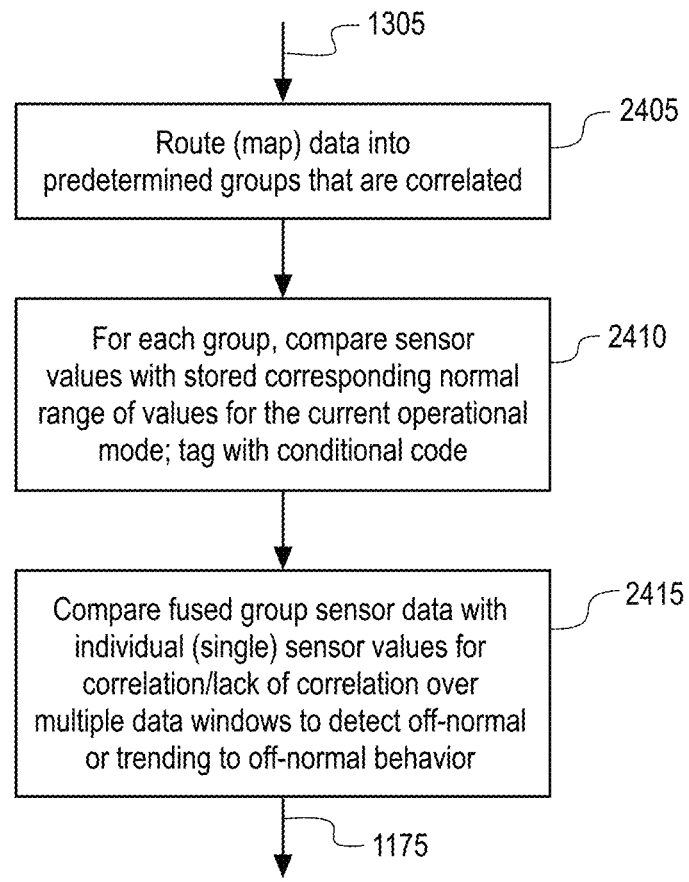
FIG. 24 is a flow diagram of exemplary steps that can be utilized to implement the data fusion of FIG. 13.

FIG. 24 shows a flow diagram of exemplary steps that can be utilized to implement the data fusion of FIG. 13. In step 2405 the incoming sensor data streams 1305 are routed (mapped) into predetermined groups in which each of the data streams within a group are correlated. The correlation of sensor data is explained above. Since each of the sensor data streams are uniquely identified and the sensors within a group that are correlated are predetermined and stored in memory, such as by manual input by a modeling engineer (FIG. 2) that identifies the sensors in each correlated group. This information is stored in memory and then retrieved to segregate the incoming data streams into correlated groups. These correlated groups may be temporarily stored in memory for individual analysis as well as correlation analysis for any faults indicated by individual sensor outputs.

In step 2410, for each of the correlated groups, the sensor values are compared with corresponding normal range of values associated with the current operational mode. Based on this analysis, the sensor data associated with a group identified to be off normal is tagged with a conditional code. In step 2415, the fused group sensor data is compared with individual (single) sensor values for correlation or lack of correlation over multiple data windows to detect off-normal or trending to off-normal behavior. For example, individual sensor data coming from one of sensors 1110 or 1130 that is correlated with a group of correlated high-frequency sensors 1150 can be useful in either confirming an anomaly or preventing a potential false alarm where the individual sensor data is not validated by other off normal sensor outputs by others in the group. Alternatively, such an individual sensor data may reflect normal operation while the corresponding group of correlated sensors from high-frequency sensors may show a trend towards an off-normal behavior. This represents a "false negative" for the individual sensor in which the single sensor data is not responsive enough to provide a warning that the subject component may require some form of maintenance.

Figure 25:
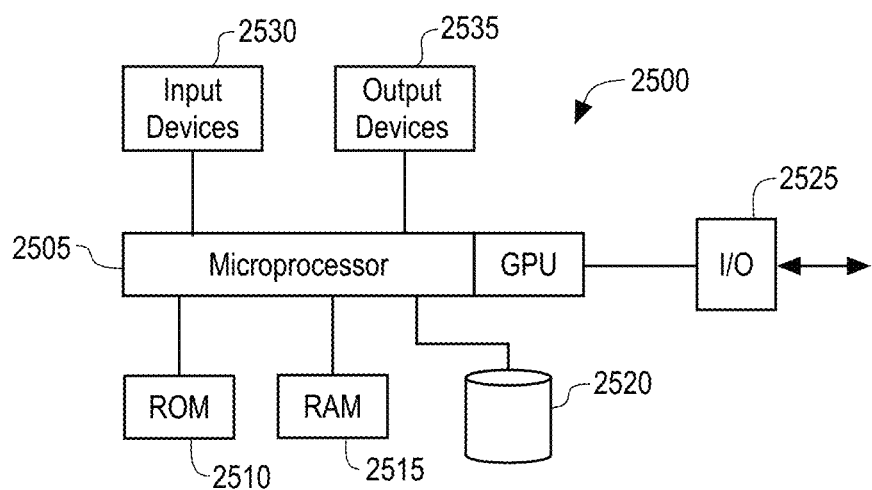
FIG. 25 is a block diagram of an exemplary computing system for implementing the high frequency sensor analysis and integration with low frequency sensor data.

FIG. 25 is a block diagram of an exemplary computing system 2500 for implementing the high frequency sensor analysis and integration with low frequency sensor data. Central to the computing system on system on chip (SOC) is microprocessor 2505 which may also include an arithmetic processing unit and/or a graphical processing unit (GPU). Alternatively, a GPU may be used by itself to process some of the computations/decisions of FIGS. 23 and 24, i.e. other than "graphical" information. A read-only memory (ROM) 2510 contains stored program instructions and data for use by the microprocessor 2505. A random-access memory (RAM) 2515 is also used by the microprocessor 2505 as a location where data may be stored and later read (the GPU also has its own RAM). A nonvolatile memory device 2520 is utilized to store instructions and/or data that will not be lost upon a loss of power to the computing system. An input/output (I/O) buffer 2525 is coupled to the microprocessor 2505 and facilitates the receipt of external data and the transmission of data from the microprocessor to external devices. Input devices 2530 represent conventional ways for a user to input information to the computing system, e.g. keyboard, mouse, etc. Output devices 2535 are conventional ways for information to be conveyed from the computer system to a user, e.g. video monitor, printer, etc. Depending on the number of parallel cores of the microprocessor 2505 (or the GPU), all cores provide sufficient computational power needed to process the data from all of the sensors in accordance with the steps explained above. For example, one core may be used to process all the data for one correlation group of sensors since all sensors in that group will have outputs that need to be stored and compared against the outputs of the other sensors in that group.

As will be understood by those skilled in the art, the ROM 2510 and/or nonvolatile storage device 2520 will store an operating system by which the microprocessor 2505 is enabled to communicate information to and from the peripherals as shown. More specifically, sensor data is received through the I/O 2525, stored in memory, and then processed in accordance with stored program instructions to achieve the detection of anomalies and degradation of components associated with the respective sensors. Based on the analysis of the sensor data as explained above, those skilled in the art will know how to implement in the computer system software to determine different length moving averages such as discussed with regard to FIGS. 18-21 over consecutive moving data windows and compare the respective values of the different length moving averages with stored threshold values for a particular mode of operation. Similarly, with respect to FIG. 22, those skilled in the art will know how to calculate in software the slope, mean, and standard deviation for sensor data in consecutive moving data windows and compare the results with stored criteria. Different thresholds and values are stored in memory corresponding to the different modes of operation of the respective vehicle. Upon determining the mode of operation, the corresponding stored thresholds and values will be utilized for comparison with the information derived from the sensors during the respective mode of operation. In contrast to utilizing just a fixed upper and lower threshold value for determining a normal range of operation for a given sensor for all types of operational conditions, the techniques described herein provide for a dynamic, i.e. changing, criteria for a given sensor to determine anomalies/degradation dependent upon changes in the sensor data and/or the mode of operation of the vehicle.

If used and unless otherwise stated, the terms "upper," "lower," "front," "back," "over," "under," and similar such terms are not to be construed as limiting embodiments to a particular orientation. Instead, these terms are used only on a relative basis.

Figure 26:
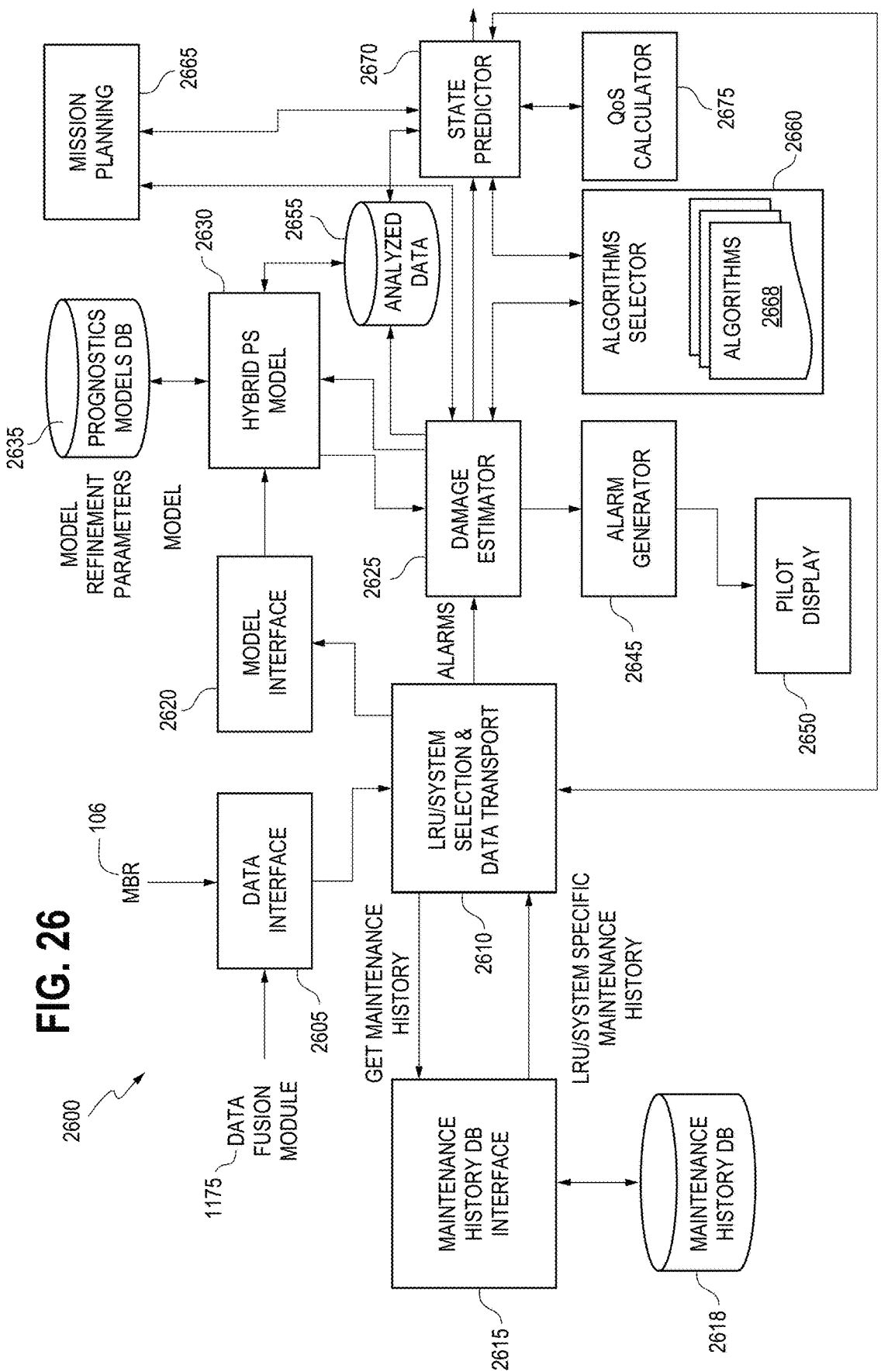
FIG. 26 is a block diagram of an exemplary prognostics system for determining the need for maintenance on a component level based on its condition.

FIG. 26 shows a block diagram of an exemplary prognostics system 2600 for determining the past, current, and future states of performance/degradation at the component level, and for determining whether maintenance at the component level is required for the aircraft/system while providing aircraft/system equipment degradation/failure situational awareness. The system 2600 operates on a component level basis, i.e. at any given time the data and information being processed may relate to a single component or multiple components simultaneously depending on detected and tagged anomalous behavior of the component(s) data from the Data Fusion Module 1175 and output from MBR Diagnostics Engine 106, allowing for interconnected degradation/failure modes between multiple interrelated components. To process all of the data and information from the plurality of components in a complex vehicle system, the prognostics system 2600 may consist of a plurality of processing systems each devoted to processing information and data associated with a different single component.

The Data Interface Module 2605 takes input 1175 from the Data Fusion Module, identifies the tagged data and alarms, and passes this separated data to the LRU/System Selection and Data Transport Module 2610. Any alarms are passed immediately by module 2610 to the Damage Estimator Module 2625. The output from 106 (MBR diagnostics engine) consists of multiple component fault codes corresponding to respective components' fault/failure and false alarm isolations as well as nominal data and functional analysis for the cause of fault/failure (e.g., leaking pipe, worn bearing, motor shaft misalignment, etc.). Both faulty and nominal data corresponds to BIT and parametric data that is passed to the Damage Estimator Module 2625. Alarms and corresponding decomposed fused data (i.e., data that is separated for degraded components in LRU/System Selection & Data Transport Module 2610 for each component and built into multiple streams that are simultaneously transferred into various modules with highest priority given to component data with alarms) from multiple sources are also passed to the Damage Estimator Module 2625 from the Data Fusion Module 1175 via the Data Interface 2605 and the LRU/System Selection & Data Transport Module 2610.

The LRU/System Selection & Data Transport Module 2610 identifies and separates the pertinent tagged data (tagged data with alarms getting the highest priority) associated with the component to be analyzed and the corresponding BIT, parametric, analogs (direct sensor signals without analog-to-digital (A/D) conversion), discretes (hardware ON/OFF control signals passed via software bits), environmental (internal environmental conditions e.g. humidity, pressure, temperature, dust, others), and external metrological data (e.g., sand, dust, heat, wind, rain, others), etc. air vehicle data. This data is transmitted to the Model Interface Module 2620. Model Interface Module 2620 creates multiple streams of data one for each component. The tagged data is metadata obtained from the Anomaly Detector (high frequency sensors), low frequency sensors, and other data streams with tagged alarms and data fused with corroborated evidence data. Corroborated evidence data consists of data representing 1) no fault, 2) fault, 3) a false alarm either false negative or false positive, and 4) functional analysis for cause of 2) and 3). Corroborated evidence data from various interacting/interconnected component sensors for the current component fault/failure mode is received from the Anomaly/Degradation Detector Module 1160, fused in the Data Fusion Module 1175, and provided to the Data Interface Module 2605. This data is decomposed in the LRU/System Selection & Data Transport Module 2610 for the current component fault/failure mode. Independently corroborated evidence data is received from the MBR Diagnostics Engine 106 that performs fault/failure/false alarms isolations from various interacting/interconnected components sensors parametric and BIT data for the current component fault/failure mode. LRU/System Selection & Data Transport Module 2610 also requests via the Maintenance History Database Interface 2615 case-based histories from the Maintenance History Database 2618 associated with the pertinent component maintenance data (including pilot squeaks and maintainer notes post flights), which is then compared in real time against current anomalous component behavior and alarm data. These histories are case-based records and stored parameter values for the pertinent component. Maintenance History DB Interface Module 2615 may, for example, utilize ANSI SQL statements to extract previously stored repair and replacement information and tests conducted, contained in these maintenance records written by the maintainer. The maintainer is the technician assigned to perform the maintenance on the aircraft/system components for which he/she has attained maintenance certification. These maintenance records also contain previously stored inflight real time assessments by the prognostics engine and stored in the Maintenance History Database 2618, which is preferably a relational database. The maintainer enters maintenance notes via a graphical user interface (GUI) when fixing or repairing or replacing a component and additional visual observation on the status of a component's degradation. The pertinent records also contain the original BIT and sensor parametric recorded data from which degradation is determined. Recorded notes may also contain manually input explanations on the nature of an alarm and functional analysis of why the component alarm was issued and what remediation steps were taken to fix the alarm/problem.

The Model Interface Module 2620, based on the decomposed tagged data received from LRU/System Selection & Data Transport Module 2610 for a particular component, transmits a request to the Prognostics Model Database 2635 identifying the associated component and requesting that the Prognostics Model Database 2635 transmit the relevant physics-based model, e.g. an XML file, empirical model, e.g. an XML file, and physical system logical/functional model, e.g. an XML file to the Hybrid PS Model Module 2630. These models/files are the "blue prints" that contain the diagnostics and prognostics definition of and knowledge of the component in terms of the respective component attributes, functions, behaviors, and semantics. As will be explained in more detail with regard to FIG. 27, a physics-based model of the relevant component utilizes values associated with component compared to the current corresponding data values to generate a residue along with an empirical model of the relevant component which also generates a resulting residue. These residues are combined to form the complete observation of current data as compared to the combined models. Near zero residues imply no anomalous component behavior (small residues may be caused by noise in the component which may be later eliminated by training the system off-line from collected data).

The Damage Estimator Module 2625 utilizes the residues from the physics-based model (i.e., physical system damage equations) and empirical model along with physical system logical/functional model to generate a representation of the degradation behavior of each component. The residues are the differences between the expected component attributes, functions, behaviors, and semantics and the corresponding attributes generated by the current data streams for the component being evaluated. Residues are generated for each of the three models during the evaluation of a component and are typically near zero for aircraft components with good performance. The level of degradation represents the severity level of the alarm displayed to the pilot/mission operator. The alarm levels may, for example, be correlated to the remaining useful life (RUL) of the component which is determined by the Damage Estimator Module 2625. An RUL between 70% and 51% may indicate a mild degradation behavior (assuming a gradual decline and not a sharp drop from recent RUL values), between 50% and 11% representing a medium degradation behavior, and below 11% requiring repair or replacement of the component. Of course, various percentages may result depending on the anticipated future wear/degradation and severity of future environments. The Damage Estimator Module 2625, RUL and EOL (end of life) determination are explained in more detail below.

The Alarm Generator Module 2645 generates alarms based on the level of the RUL determined by the Damage Estimator Module 2625. It calculates the slope of the RUL from current and previous stored RUL data and generates the level of the alarm based on this slope and the current value of the RUL. For example, a change of slope greater than a predetermined amount would likely signal too rapid a degradation and cause an alarm even if the value of the RUL alone would not warrant generating an alarm. This is further described for FIG. 30. The calculated RUL curve 3005 is determined from history and current data. For the degraded component, the slope 3010 is calculated dynamically over a sliding window of RUL calculations. The final RUL curve slope is calculated over a few consecutive sliding windows, e.g. 3 windows. This is the mean of the RUL curve slope that is calculated, weighted and normalized to the same units as the y-axis (RUL axis) to produce one-to-one unit of measure relationship between the y-axis and x-axis (i.e., the time axis to produce a unit-less slope). This unit-less slope is compared against a predefined threshold e.g. 0.5. If this slope is greater than the predefined threshold, an alarm is issued. The time unit (x-axis value) is the difference in start of operations and the current time (within each sliding window) and the starting RUL is the historic RUL at the start of operations (i.e., used in the first sliding window; subsequent sliding windows use the last RUL calculation in the previous sliding window, and so on). The alarms are passed to the Pilot Display 2650 that presents visual indicia indicating the level of an alarm with associated LRU/component for pilot actions. Depending on the amount of degradation, the specific component and the flight and mission criticality of the component, a decision could be to continue with a flight mission even with a known degraded component.

The Algorithm Selector Module 2660 determines the algorithms utilized by the Damage Estimator Module 2625 and the State Predictor Module 2670. Algorithms 2668 associated with the component currently being analyzed are identified and loaded from the Algorithms Selector Module 2660 into memory for Damage Estimator Module 2625 and State Predictor Module 2670 for processing. The State Predictor Module 2670 uses historic past state and calculates the current and predicted future states for the component being analyzed (using the particle filter algorithm). These states are updated as new BIT, parametric sensor, analog, discretes, environment, etc. data relevant to the subject component are received. The Analyzed Data Database 2655 receives and stores all the analyzed data by the Damage Estimator Module 2625 along with hybrid model parameters from the Hybrid Model Module 2630 and the State Predictor Module 2670.

The Quality of Service (QoS) Calculator 2675 calculates an IVHM diagnostics and prognostics system level quality of service metric as well as component level quality of service metric. Some of these metrics are depicted in FIG. 28. Note, in FIG. 28, all metrics are pertinent to current aircraft/system and its components. RUL is calculated in the Damage Estimator Module 2625, while end-of-life (EOL) which is a future prediction, is calculated in the State Predictor Module 2670. Component QoS metrics are calculated in the QoS Calculator Module 2675 for the subject vehicle/aircraft and are stored for all current aircraft in the Analyzed Data DB 2655. An off-line ground-based fleet level prognostics system accumulates data (mines data) from all aircrafts/systems and produces reports for single, multiple, or the entire fleet from these stored metrics. These QoS metrics are passed to the State Predictor Module 2670 which then stores this information in the Analyzed Data DB 2655; to be retrieved later off-line on ground for various report generation and data replay. The Mission Planning 2665 provides the mission profile to the Damage Estimator Module 2625 and mission planning information to the State Predictor Module 2670. The Mission Planning Module 2665 receives equipment damage information from the Damage Estimator Module 2625 for building a degraded mission plan, i.e. an alternate modified mission plan (if possible) dependent on the degree of component degradation. The State Predictor Module 2670 periodically receives updated mission plans from the Mission Planning Module 2665 and in return provides current equipment and future equipment degradation states to Mission Planning Module 2665 that builds reactive and proactive mission plans based on the condition of the equipment. All analyzed data by the Damage Estimator Module 2625 and the State Predictor Module 2670 results are stored in the Analyzed Data 2655.

Figure 27:
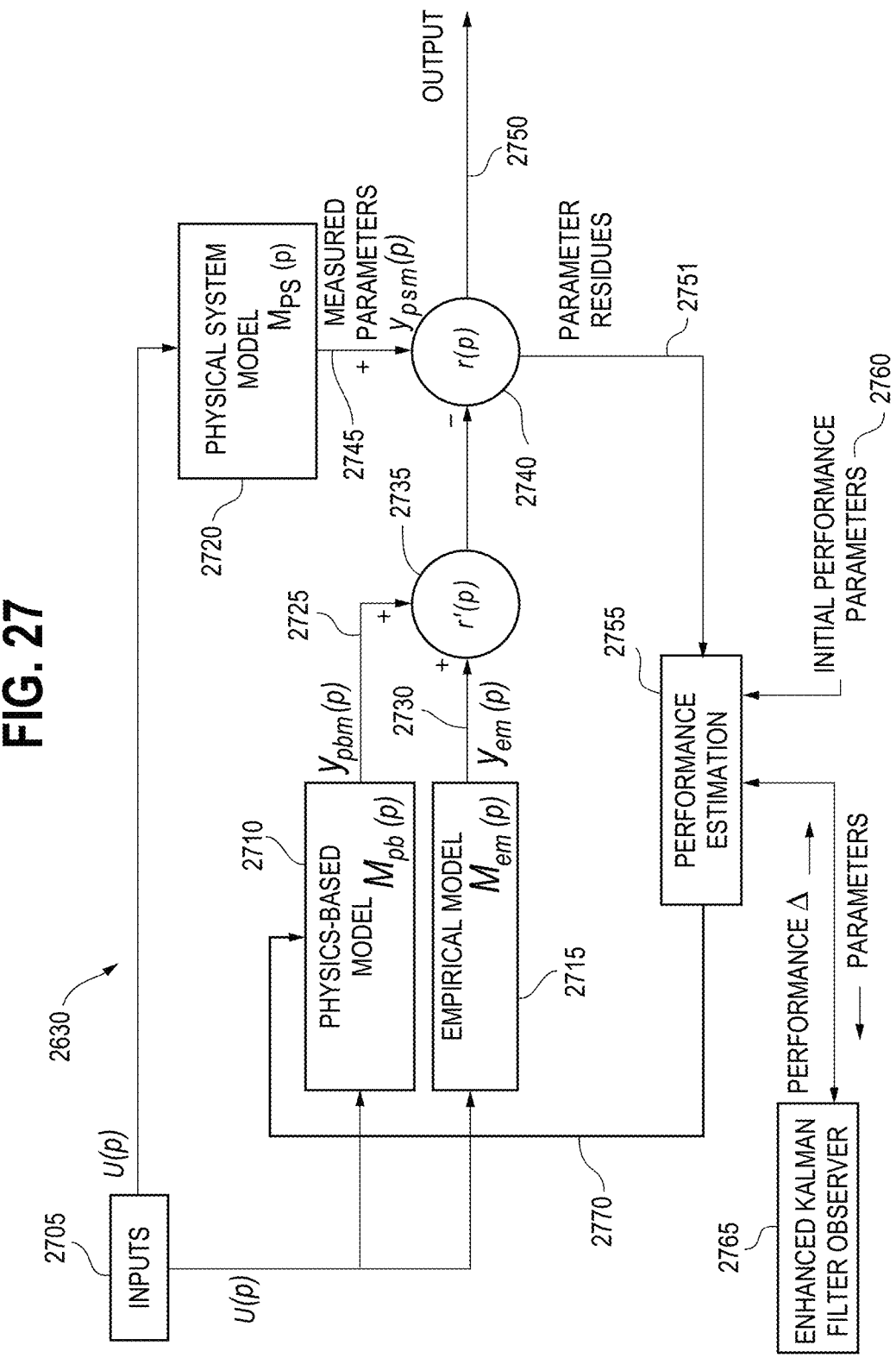
FIG. 27 is a block diagram of an exemplary hybrid system of different models characterizing the behavior and parameters of each component.

FIG. 27 shows a block diagram of an exemplary Hybrid Model System 2630 that consists of: 1) Physics-Based Model Module 2710, 2) Empirical Model Module 2715, and 3) Data-Driven Functional Physical System Model Module 2720, of each component where the respective component's behavior and the trend towards degradation are reliably characterized. Any potential inaccuracies and deficiencies (due to imperfections in manufacturing of components, structures, etc. and/or other causes such as micro-structural tears in wing structures, bad circuits in transistors, substandard quality materials in resistors, capacitors, etc.) in the physics-based model are effectively overcome with use of the empirical model. The empirical model residues are in general additive resolving the imperfections due various causes that have not been accounted for in the physics-based models. These residues can also be subtractive in which case the physics-based model is over specified (it is modeled with more detail than available component data on the aircraft/system). In such an event, the supplier of the component is asked to provide the additional required data at the component output. An empirical model residue of zero implies that the component conditions and states are functioning normally or that discrepancies seen previously in history have been refined sufficiently from the empirical model to produce a zero residue for the current mode of operation, usage, mission, and environment. From FIG. 27, the residue $r'(p)$ and $r(p)$ can be represented mathematically:

$$M_{pb}(p) = \frac{y_{pbm}(p)}{u(p)}$$

where:

$p$ = parametric sensor data $M_{pb}$ = physics-based model $y_{pbm}$ = parametric output of model $u$ = input stream of parametric data $M_{em}(p) = \frac{y_{em}(p)}{u(p)}$; similar definitions $M_{ps}(p) = \frac{y_{ps}(p)}{u(p)}$; similar definitions The residues $r'(p)$ and $r(p)$ are defined as:

$$r'(p) = y_{pbm}(p) + y_{em}(p) = y_{pbm}(p) + M_{em}(p)u(p) = \{M_{pbm}(p) + M_{em}(p)\}u(p)$$

$$r(p) = y_{ps}(p) - r'(p)$$

The residual zero or near zero is ideal for matching the component process and model. Of course, additive noise will change the residual and must be accounted for in the model if not eliminated from the system.

The three-tier models contain the entire prognostics models of the component and are preferably stored as XML files. The Inputs 2705 for each of the models is the parametric data sensed for each respective component, i.e. the output of the Data Fusion Module 1175 and MBR Diagnostics Engine 106. The residue outputs 2725 and 2730 from the Physics-based Model Module 2710 and Empirical Model Module 2715, respectively, are summed by summation node 2735 with its output forming an input to summation node 2740. The residue output 2745 from the Physical System Model Module 2720 forms the other input to summation node 2740 which is subtracted from the other input, i.e. the combination of the addition of the residues from the Physics-based Model Module 2710 and Empirical Model Module 2715 (i.e., this combination of residues representing the difference between anticipated behavior vs observed behavior as shown in FIG. 1).

The output 2751 of the summation node 2740 is an input to the Performance Estimation Module 2755 and the output 2750 is forwarded to Damage Estimator Module 2625, stored in Analyzed Data 2655, and model parameter refinements into the Prognostics Models DB 2635. State Predictor Module 2670 receives the updated analyses (consisting of model parameters and residues) from the Analyzed Data 2655. In Performance Estimation Module 2755 the initial input is received from the Initial Performance Parameter Database 2760 which stores historical performance data on every aircraft/system component. A comparison of the parameter residues 2751 and the corresponding parameters obtained from database 2760 provides an input to the Enhanced Kalman Filter Observer Module 2765 which filters the input and provides an output to Performance Estimation Module 2755 containing a delta differential of performance. The output of Performance Estimation Module 2755 is a feedback loop routed to Physics-based Model 2710 where a predetermined performance difference from the expected and historical performance measures triggers a root cause analysis. Continuous decreasing performance is caused by a corresponding increasing degradation of the component.

Figure 29:
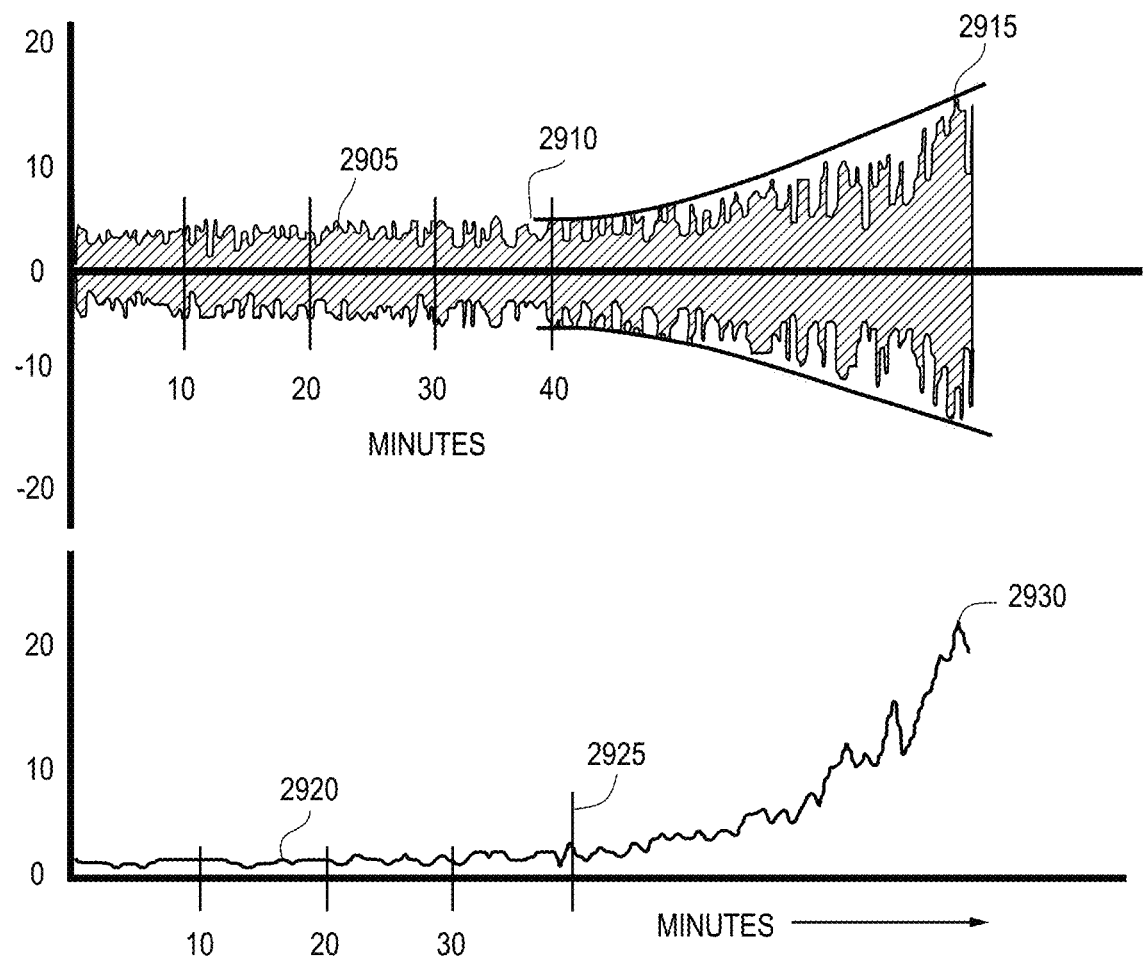
FIG. 29 shows exemplary degradation for a brine pump's bearing performance and power distribution performance.

As an example, a degraded brine pump was selected and monitored for its various component signals over tens of minutes of operation. The degradation for this pump's bearing performance and pump's power distribution performance is shown in FIG. 29. Over minutes of operation, the bearing vibrational amplitude 2905 quickly rises from normal operation to an onset 2910 of degradation, to the point 2915 of possible eminent failure. Similarly, in FIG. 29 the pump's power distribution 2920 rises sharply starting at the onset 2925 of bearings degradation. The large power 2930 required may cause additional pump component degradations if allowed to continue at this level of operation. Over many flights more accurate initial performance parameters are obtained from off-line on ground training on models and algorithms performed via collected data and improvements/refinements of the models and algorithms as a continuous process.

The Physics-based Model 2710 will contain a plurality of equations that characterizes the operation of the subject component based on physics of the component, e.g. electrical, mechanical, fluid dynamics, etc. It describes the nominal behavior and when component damage indication exists (from input parametric and BIT data streams), how this damage is expected to grow, both in quality and quantity. Damage indications may not be monotonic in nature. Damage could be caused by the intrinsic properties of the component (e.g., effects due to recovery in batteries, or semiconductors in power systems) or extrinsic effects such as incomplete/partial maintenance actions. Each fault mode may in general have a different damage propagation model. The Empirical Model 2715 is very helpful in capturing these differences in different component fault mode damage variations and possibly component healing (if hardware has this capability) of the component Physics-Based Model 2710. These equations will, of course, vary depending upon the particular component that is to be characterized. For example, the exemplary brine pump could be characterized with individual component operations as shown in Table 1 below.

TABLE 1

| Brine Pump Component | Equation | Physics |
|---|---|---|
| Bearings | $\dot{T}_t = \frac{1}{J_t}(r_t\omega^2 - H_{t,1}(T_t - T_o) - H_{t,2}(T_t - T_a))$ <br><br> $\dot{T}_r = \frac{1}{J_r}(r_r\omega^2 - H_{r,1}(T_r - T_o) - H_{r,2}(T_r - T_a))$ <br><br> $\dot{T}_o = \frac{1}{J_0}(H_{o,1}(T_t - T_o) + H_{o,2}(T_r - T_o) + H_{o,3}(T_o - T_a))$ | Thrust Bearing Temperature <br> Radial Bearing Temperature <br> Bearing Oil Temperature |
| Load Torque | $\tau_L = a_0\omega^2 + a_1\omega Q - a_2\omega Q^2$ | Torque Load on Brine Pump Shaft |
| Pump Shaft Angular Velocity | $\dot{\omega} = \frac{1}{J}(\tau_e - r\omega - \tau_L)$ | Shaft Rotational Velocity |
| Pump Pressure Discharge Flow | $p_p = b_0\omega^2 + b_1\omega Q - b_2 Q^2$ <br><br> $\dot{Q} = \frac{1}{J_Q}(Q_0 - Q_i)$ | Pressure <br> Brine Flow |
| Impeller Wear | $\dot{A} = -\omega_A Q_i^2$ <br> $\dot{r}_t = \omega_t r_t \omega^2$ <br> $\dot{r}_r = \omega_r r_r \omega^2$ | Rate of Change of Impeller Area <br> Rotational Thrust <br> Radial Thrust |

The definitions of the above parameters are given in Table 2.

TABLE 2

| Parameter | Description | Units |
|---|---|---|
| $p_s(t)$ | Suction Pressure | Pascal (Pa) |
| $p_d(t)$ | Discharge Pressure | Pascal (Pa) |
| $T_a(t)$ | Ambient Temperature | Kelvin (K) |
| $V(t)$ | Motor Generator Voltage | Volts (V) |
| $\omega_s(t)$ | Synchronous Speed of Motor Voltage | rad/sec |
| $\omega(t)$ | Mechanical Rotation | rad/sec |
| $Q(t), Q_i(t), Q_0$ | Pump Flow, Flow through Impeller, Initial Flow | meter$^3$/sec |
| $J_o, J_Q$ | Thermal Inertia of Oil, Flow Inertia | K/(J * s), 1/sec |
| $\tau_L, \tau_e$ | Load Torque, Motor Torque | Newton meter |
| A | Impeller Area | meter$^2$ |
| $T_o(t), T_t(t), T_r(t)$ | Oil Temperature, Thrust Bearings Temperature, Radial Bearings Temperature | K |
| $v_{rms}$ | Root-mean-square voltage (in volts) applied to pump motor | Volts |
| $\omega_s$, s | Synchronous speed due to supply voltage of motor, 's' is the slip due asynchronous behavior between $\omega_s$ and $\omega$ (motor mechanical rotation) | rad/sec, no units |
| $r_t(t)$ | Thrust Coefficient of Friction | Newton meter sec |
| $r_r(t)$ | Radial Coefficient of Friction | Newton meter sec |
| $b_0(t)$ | Coefficient Proportional to Impeller Area | kg/m |
| $H_{o,i}, H_{t,i}, H_{r,i}$ | Oil, Thrust, Radial Heat Transfer Coefficients | Watts/K |

TABLE 2-continued

| Parameter | Description | Units |
|---|---|---|
| $a_n$, $b_n$ | Pump Geometry Coefficients | kg/m, kg/m$^2$, kg/m$^4$, kg/m$^7$ |
| $\omega_A$, $\omega_t$, $\omega_r$ | Wear Coefficients | No Units |

Typical brine pump nominal parameter values are given in Table 3.

TABLE 3

| PARAMETER | NOMINAL VALUE |
|---|---|
| $\omega(0)$ | 376 rad/s |
| J | 50 kg m$^2$ |
| r | $8.0 \times 10^{-3}$ N m s |
| n | 3 phases |
| p | 1 pole pair |
| $R_1$, $R_2$ | $3.6 \times 10^{-1}$ Ω, $7.6 \times 10^{-2}$ Ω |
| $L_1 + L_2$ | $6.3 \times 10^{-4}$ H (Henries) |
| Q(0) | 0 m$^3$/s |
| $a_0$ | $1.5 \times 10^{-3}$ kg m$^2$ |
| $a_1$ | 5.8 kg m |
| $a_2$ | $9.2 \times 10^{-3}$ kg/m$^4$ |
| $b_0(0)$ | 12.7 kg/m |
| $b_1$ | $1.8 \times 10^4$ kg/m$^4$ |
| $b_2$ | 0 kg/m$^7$ |
| $J_Q$ | 376 rad/s |
| $T_o(0)$, $T_r(0)$, $T_t(0)$ | 290 K |
| $J_o$, $J_t$ | $8.0 \times 10^3$ K/(J * s), 7.3 K/(J * s) |
| $H_{o,1}$, $H_{o,2}$, $H_{o,3}$ | 1.0 W/K, 3.0 W/K, 1.5 W/K |
| $H_{r,1}$, $H_{r,2}$ | $1.8 \times 10^{-3}$ W/K, $2.0 \times 10^{-2}$ W/K |
| $H_{t,1}$, $H_{t,2}$ | $3.4 \times 10^{-3}$ W/K, $2.6 \times 10^{-2}$ W/K |
| $r_r(0)$, $r_t(0)$ | $1.8 \times 10^{-6}$ N m s, $1.4 \times 10^{-6}$ N m s |

The Empirical Model 2715 provides a model of the subject component data values that models normal system operation based on a statistically significant sample of operational data of the component. Such an empirical model based on historical performance data of the component allows for a wider variation of performance expectations than the physics-based model since the same component may have been operated under different stress levels and/or in different environments. As an example, monitoring time dependent (at different times of the day over days, weeks, months, etc.) fluid flow through the brine pump impeller housing and pipes characterizes local brine pump operations and usage. The corresponding data values provide a statistically significant empirical model that empirically defines the brine pump as utilized in local aircraft/system operations and usage. By utilizing the empirical model, differing RUL and EOL predictions for identical brine pumps at different locations on the same aircraft/system or identical brine pumps in other aircrafts/systems provides for real world variations by which the RUL and EOL of monitored brine pumps can be judged. Such results provide increased accuracy for predictions of RUL and EOL.

The Physical System Model 2720 is a data-driven functional model. The prognostics nodes in the Physical System Model 2720 contain the expected usage parameters of the component pertinent to the mission profile of the aircraft/system and its operating modes (i.e., preflight, taxi, takeoff, loiter, etc.). The observed/measured behaviors, i.e. data values, are compared against the corresponding functional model, i.e. acceptable ranges (thresholds) of values for the corresponding measured data values, which are a "blue print" of acceptable behaviors with the residue 2745 of this comparison being the output.

Figure 31:
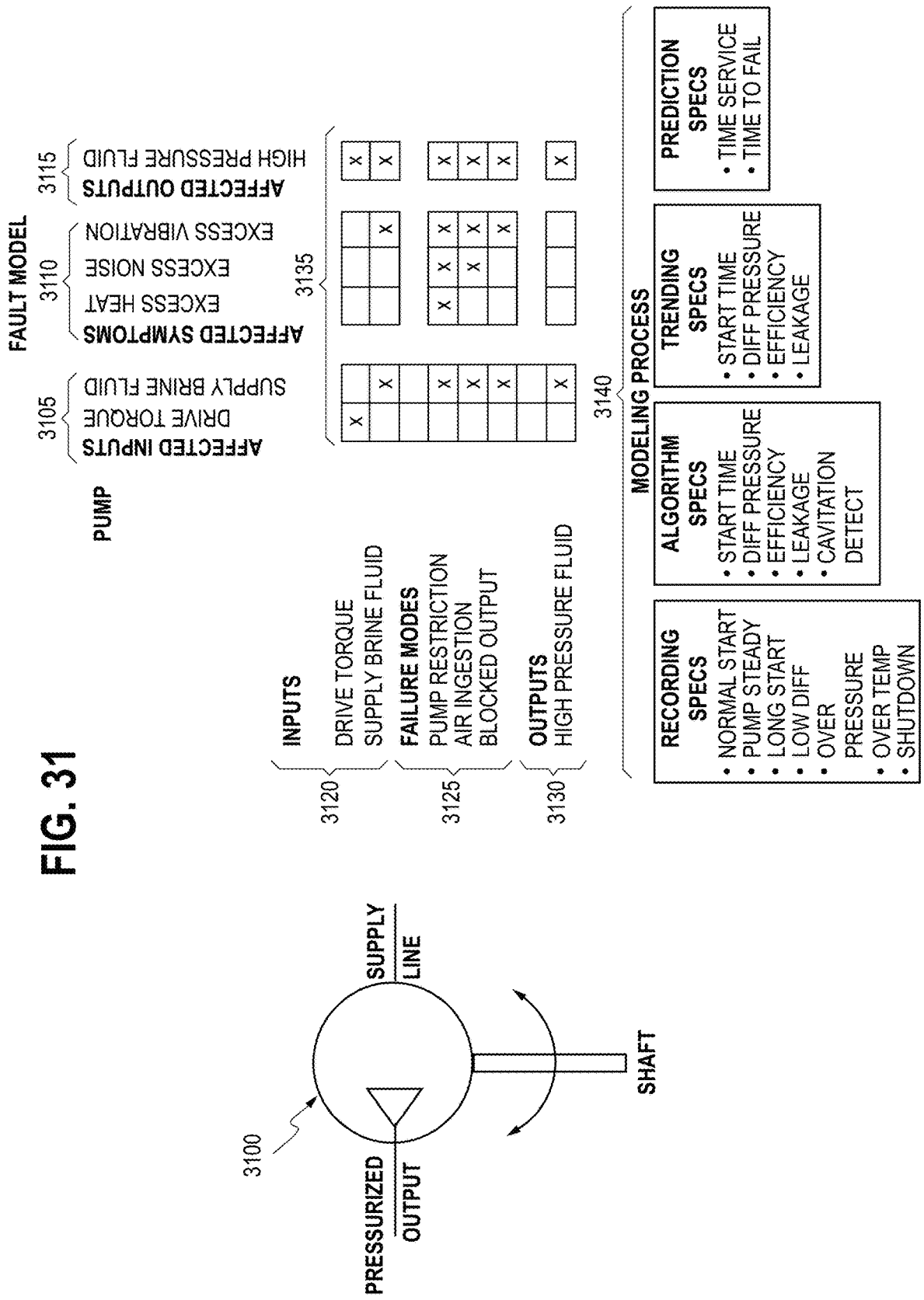
FIG. 31 illustrates brine pump components as monitored in an exemplary physical system model of the brine pump.

For example, a subset of brine pump components of an exemplary Physical System Model 2720 is shown in FIG. 31. It consists of a "fault model" and a "modeling process" which uses different parameters/characteristics that models the brine pump, in this example a subset of brine pump components is shown. A partial brine bump representation 3100 shows a brine "Supply Line", brine "Pressurized Output" via the impeller (the black triangle), and the motor rotation shaft that provides torque supplied by the motor to circulate brine in the brine pump cooling system. The "Fault Model" consists of Affected Inputs 3105, Affected Symptoms 3110, Affected Outputs 3115, Inputs 3120, Failure Modes 3125, Outputs 3130, and the check boxes 3135. The check boxes 3135 represent correlations between Affected Inputs 3105 and Inputs 3120, Affected Symptoms 3110 and Failure Modes 3125, and Affected Outputs 3115 and Outputs 3130. As an example, note that the correlation for Pump Restriction in Failure Modes 3125 corresponds to symptoms of Excess Heat, Excess Noise, and Excess Vibration in Affected Symptoms 3110. This follows similarly for the other correlations mentioned above. These correlations provide a significant contribution to producing a high-fidelity model of the brine pump. The model must include the type of data required to understand the degradation of the component under scrutiny. The Modeling Process 3140 describes the typical data specifications that are required. Typical specifications are "Recording Specs", "Algorithm Specs", "Trending Specs" (quality and quantity of degradation), and "Prediction Specs". Other specifications may be required depending on the component being modeled (e.g., wiring diagram specs for electrical components, etc.).

The Performance Estimation Module 2755 and the Enhanced Kalman Filter 2765 together measure component performance differences in time dependent sliding sensor data windows. The Enhanced Kalman Filter 2765 is used as an observer of component sensor parameter(s) over time. That is, it uses sensor parameter(s) history to monitor and calculate the change in the parameter(s) of the component over a variable time dependent sliding sensor parametric data window. The Enhanced Kalman Filter provides for nonlinear dynamics in component performance. It initially calculates the performance of the component from existing stored trained data (which is trained off-line), calculates differences with current data, and compares with historic component performance. Any change in performance is forwarded to the Performance Estimation Module 2755. The Enhanced Kalman Filter Observer 2765 and the Performance Estimation Module 2755 are founded on robust banks of two-stage Kalman Filters (in the first module 2765 used as an "observer") where both simultaneously estimate the performance state and the degradation bias (if one is seen for the component; see FIG. 29 as an example of the sensor signal). Inputs 2705 pass to Performance Estimation 2755 Kalman Filter Stage One along with Parameter Residues 2751 (from Physical System Model 2720) and Initial Performance Parameters 2760. The outputs of this stage as passed that to the Enhanced Kalman Filter Observer 2765 Stage Two are new component parameters, i.e. component parameters that have been adjusted by a mean of residues over small sampling window vs directly from Inputs 2705. In Stage Two 2765, the estimation results from Stage One 2755 are taken as "measurements". The output of Stage Two 2765 provides a dynamic delta difference in performance measurements and improved component parameters for improved performance estimation in the Performance Estimation 2755. This two-stage Kalman Filters approach is designed for fast convergence with a rapid covariance matrix computation providing the abnormally behaving component fast degradation detection and isolation. Two-stage Kalman filters are generally known, e.g., V. R. N. Pauwels, 2013, Simultaneous Estimation of Model State Variables and Observation and Forecast Biases Using a Two-Stage Hybrid Kalman Filter, NASA, ASIN: B01DG0AT6A. The two-stage mechanism also decides if sensor parametric data shows degradation, locates the sensor, quantifies the degradation, and outputs the result.

Figure 34:
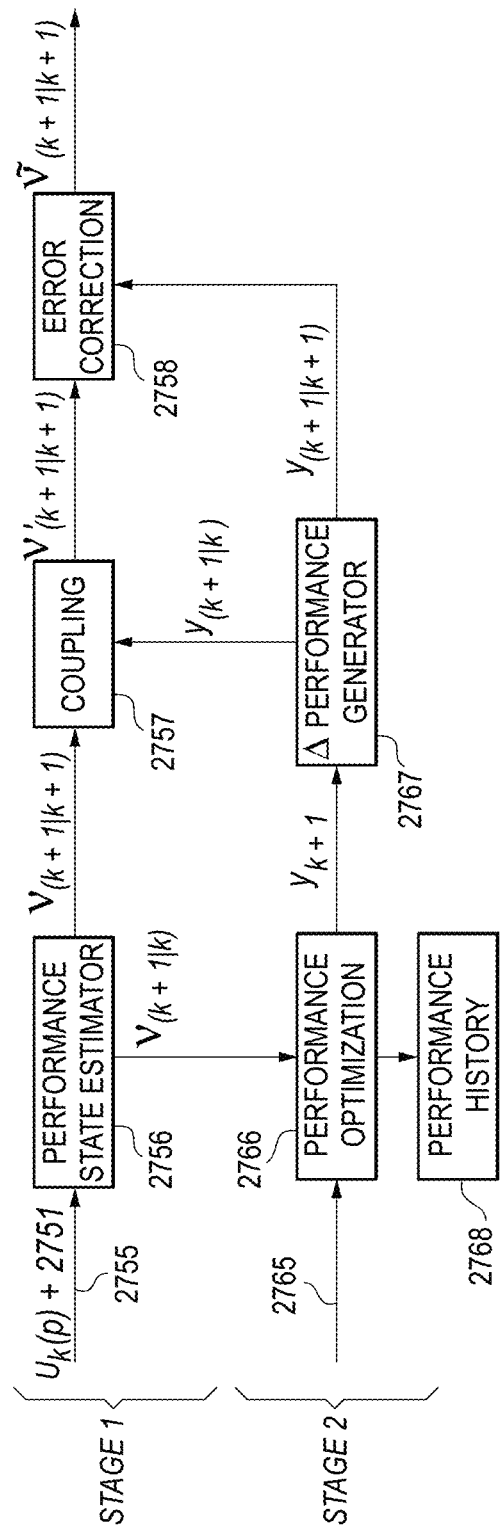
FIG. 34 is a block diagram that shows an exemplary embodiment of the two stage Kalman Filter of FIG. 27 in more detail.

The two-stage Kalman Filter is depicted in more detail in FIG. 34. Discrete linear time-varying state-space time equations are used to describe the dynamics of the component parameters: These are:

$$u_{k+1} \approx C_1 u_k + C_2 v_k - C_2 Z_k y_k + w_k^u$$

where
$u_k$ is the input data stream
$v_k$ is the first performance estimate
$y_{k+1} = y_k + w_k^y$
$C_1$ and $C_2$ are constants $$Z_k = \begin{pmatrix} z_{1_k} & \cdots & 0 \\ \vdots & \ddots & \vdots \\ 0 & \cdots & z_{n_k} \end{pmatrix}$$

covariance matrix provides the parameter coupling between stage1 and stage2 $w_k^u$ and $w_k^y$ are uncorrelated random Gaussian vectors Input data stream $u_k(p)$ and residue 2751 goes to Performance State Estimator Module of 2756 of Performance Estimation Module 2755 which calculates two sets of equations 1) the time update equations and 2) the measurement update equations. These are distinguished in FIG. 34 with subscripts (k+1|k) for time update equations and (k+1|k+1) for measurement update equations. Time update equations are responsible for calculating a priori estimates by moving the state and error covariance 1 . . . n steps forward in time. Measurement equations are represented by a static calculation of $u_{k+1}$ and are responsible to obtain a posteriori estimates through feedback measurements into the a priori estimates. Time dependent updates are responsible for performance prediction while measurement updates are responsible for corrections in the predictions. This prediction-correction iterative process estimates states close to their real values. The measurement equations $v_{(k+1|k+1)}$ are passed to the Coupling Module 2757. New time dependent parameter states $v_{(k+1|k)}$ are passed to the Performance Optimization Module 2766 and parameter states with subscript (k+1|k) are modified with parameter residues 2751 where parameter states with subscript (k+1 k+1) do not included residues in their determination.

Performance History Module 2768 provides, maintains, and updates history of optimized performance predictions. New optimized performance states $y_{k+1}$ are produced by the Performance Optimization Module 2766 and passed to the A Performance Generator Module 2767. Module 2767 provides dynamic A (delta) component parameter performance over the current number of forward time steps 1 . . . n. Module 2767 passes the time dependent delta updates $y_{(k+1|k)}$ to Coupling Module 2757 and the measurement updates $y_{(k+1|k+1)}$ the Error Correction Module 2758. The Coupling Module 2757 couples (solves for) the measurement updates $v_{(k+1|k+1)}$ and time dependent delta prediction updates $y_{(k+1|k)}$ via solving the covariance matrix $Z_k$ resulting in the final performance parameters $\tilde{v}_{(k+1|k+1)}$ corrected for errors in the Error Correction Module 2758.

Figure 35:
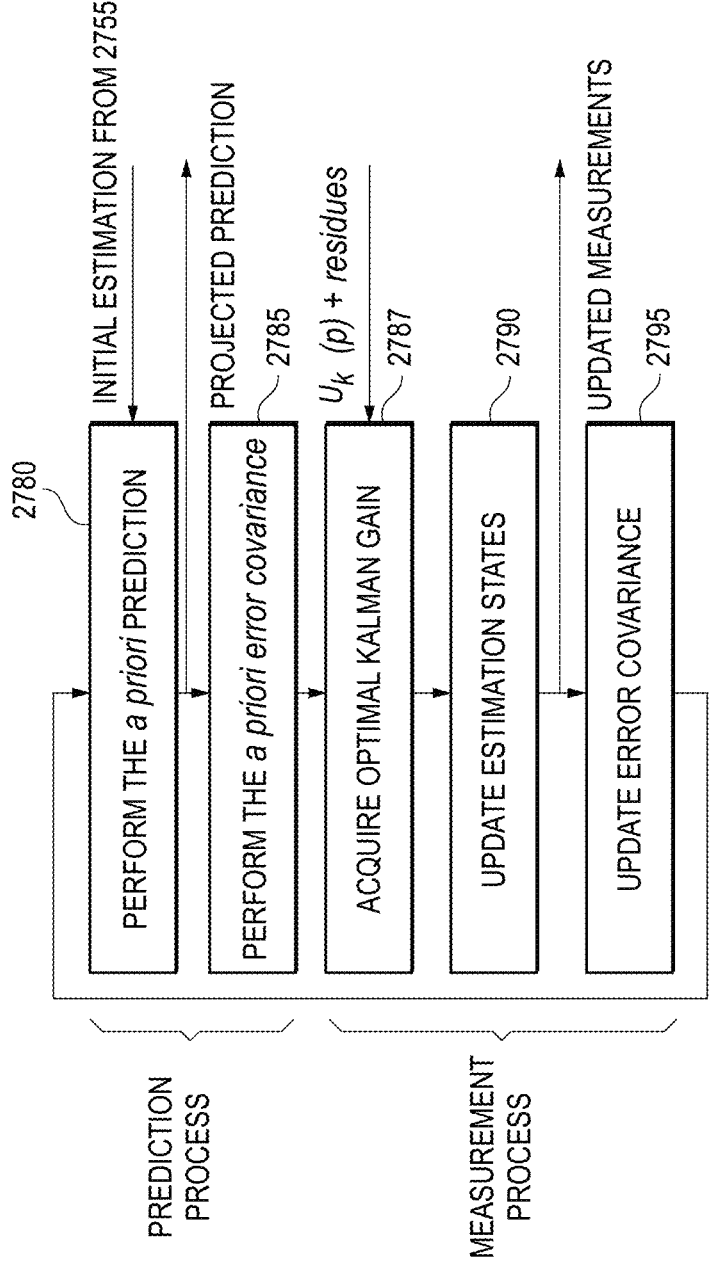
FIG. 35 is a flow diagram of a method for exemplary steps showing the functioning of the two stage Kalman Filter.

The flow chart utilized with the two-stage Kalman Filter method is shown FIG. 35. The process runs recursively; it covers the prediction of a priori state in step 2780 and a priori error covariance in step 2785, and the calculation of optimum Kalman gain in step 2787. It updates the a posteriori predicted state in step 2790 and a posteriori error covariance in step 2795. The process is then recycled to the initial step 2780 for the next processing cycle. This result is routed via the feedback loop to the Physics-Based Model Module 2710. The Physics-Based Model Module 2710 uses this result in determining if there are any deficiencies in the physics-based modeling. The size (quantification) and the rate of the degradation event over multiple time dependent sliding data windows (i.e., from the output results of the Performance Estimation Module 2755) enhance model refinement. These refinement results and associated sensor parametric data are stored in the Prognostics Models DB 2635 for later replay and learning/training.

The Damage Estimator Module 2625 makes a determination of the amount of damage for each component. For the brine pump example, the damage vector equation is given by (note that all variables in the physics-based model equations are directly measured parametric sensor values or derived values from these sensor parametric data):

Friction Wear (Sliding and Rolling Friction)

$$r_{thrust}(t) = w_{thrust} r_{thrust} \omega^2;$$

$$r_{radial}(t) = w_{radial} r_{radial} \omega^2;$$

where
$w_{thrust}$=the thrust bearing wear coefficient
$w_{radial}$=the radial bearing wear coefficient
$\omega$=pump rotational speed (defined earlier)
$r_{thrust}$=the sliding friction
$r_{radial}$=the rolling friction Damage Vector $$d(t) = [a_4(t), r_{thrust}(t), r_{radial}(t)]^\theta$$

where
d(t)=is the damage vector
$a_4(t)$=is the impeller area coefficient (defined earlier)
$r_{thrust}(t)$=is the sliding friction (defined earlier)
$r_{radial}(t)$=is the rolling friction (defined earlier)
$\theta$=is pump temperature Significant damage in brine pumps occurs due to bearing wear, which is a function of increased friction (i.e., subject to friction coefficients).

Figure 30:
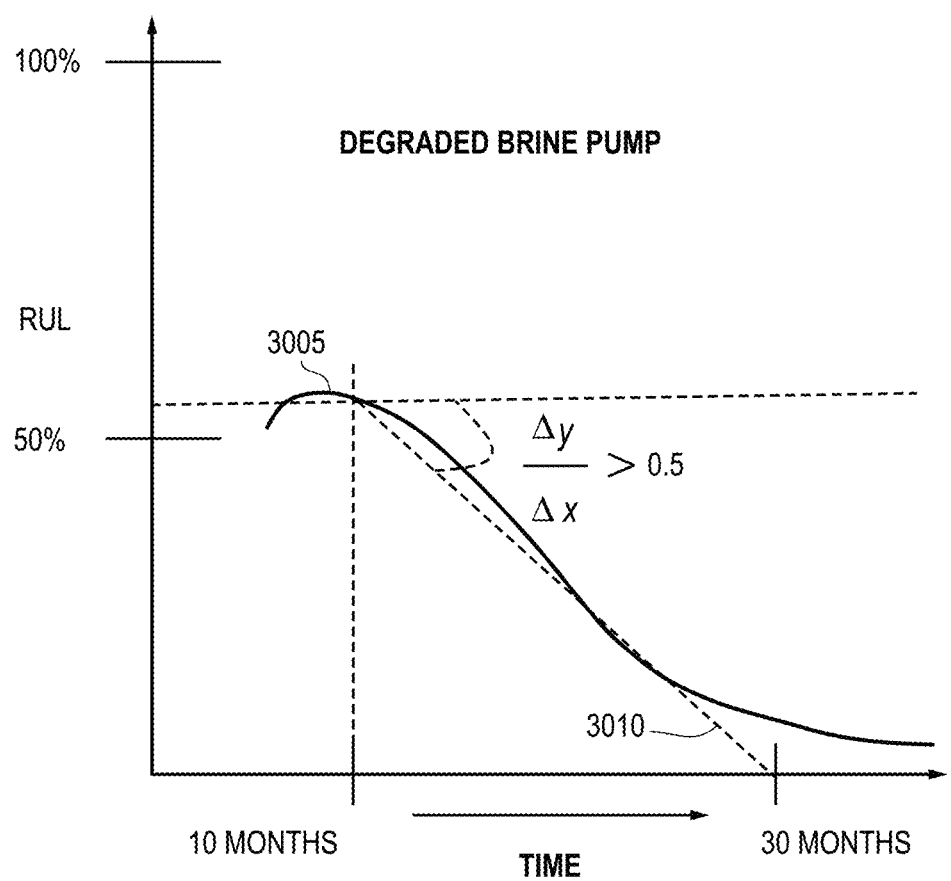
FIG. 30 is a graph showing an exemplary change of slope in brine pump performance utilized in remaining useful life determinations.

The Wear Vector is formed by the wear coefficients:

$$w(t) = \phi(t) = [w_{a_4}, w_{thrust}, w_{radial}]^\theta$$

where
$\phi(t)$ will be used as a parameter vector in predictive algorithm differentiating it from the weight calculations
$\theta$=pump temperature The RUL calculation in the Damage Estimator Module 2625 is identical to the EOL calculation discussed below for the State Predictor 2670 except that RUL is calculated for the current point in time and not a future projection/prediction in time. Typical RUL graph 3005 representing a degraded Brine Pump degradation over time is shown in FIG. 30. RUL may be estimated at any time in the aircraft/system operating history, even in the absence of faults/failures and/or component defects (i.e., the defect equation is valid for all operating conditions in either historic or current time horizons where data is available). Future predictions of RUL (where data is not available) are known as end-of-life (EOL) predictions.

State Predictor 2670 uses a state vector that is a time dependent equation. For the Brine Pump the complete state vector equation can be written as (note that all variables in the physics-based model equations are directly measured parametric sensor values or derived values from these parametric sensor data):

$$x(t)[\omega(t),\theta_{thrust}(t),\theta_{radial}(t),\theta_{oil}(t),a_4(t),r_{thrust}(t),r_{radial}(t)]^\theta$$

$\theta_{thrust}(t)$=is the temperature at thrust bearings (defined earlier)
$\theta_{radial}(t)$=is the temperature at radial bearings (defined earlier)
$\theta_{oil}$=is the temperature of the oil (defined earlier)
$a_4(t)$=the impeller area coefficient (defined earlier)
$r_{thrust}$=is the sliding friction (defined earlier)
$r_{radial}$=is the rolling friction (defined earlier)
$\omega(t)$=is the pump motor rotation (defined earlier)

State Predictor 2670 uses a state vector that is a time dependent equation, i.e., the state of the brine pump at any point in time. Together, the damage equation and the state equation define the physics of the component at any point in time.

The prediction of EOL of the brine pump is calculated numerically using a particle filter algorithm that predicts the future state of the brine pump with the equation for the state vector equation and the damage equation as defined above. The future state particle probability density (note x is the state vector given above) is given by the particle filter (PF) process:

The Particle Filter (PF) Computes $$p(x_{k_P}, \phi_{k_P} \mid y_{0:k_P}) \approx \sum_{i=1}^{N} w_{k_P}^j \delta_{(x_{k_P}^j, \phi_{k_P}^j)}(dx_{k_P} d\phi_{k_P})$$

Approximate this Distribution in n Steps $$p(x_{k_P+n}, \phi_{k_P+n} \mid y_{0:k_P}) \approx \sum_{i=1}^{N} w_{k_P}^j \delta_{(x_{k_P+n}^j, \phi_{k_P+n}^j)}(dx_{k_P+n} d\phi_{k_P+n})$$

so that the particle i is propagated n steps forward without new data available, taking its weights as $w_{k_p}^1$; EOL is approximated by $$p(EOL_{k_P} \mid y_{0:k_P}) \approx \sum_{i=1}^{N} w_{k_P}^j \delta_{EOL_{k_P}^j}(dEOL_{k_P})$$

i.e., propagate each particle forward to its own EOL while using the particle's weight at $k_P$ for the weight of its EOL prediction.

The particle filter process is a robust approach that avoids the linearity and Gaussian noise assumption of Kalman filtering, and provides a robust framework for long time horizon prognosis while accounting effectively for uncertainties. Correction terms are estimated in off-line training/ learning to improve the accuracy and precision of the algorithm for long time horizon prediction from collected Analyzed Data 2655. Particle filtering methods assume that the state equations that represent the evolution of the degradation mode in time can be modeled as a first order Markov process with additive noise, iteratively refined sampling weights, and conditionally independent outputs.

Figure 33:
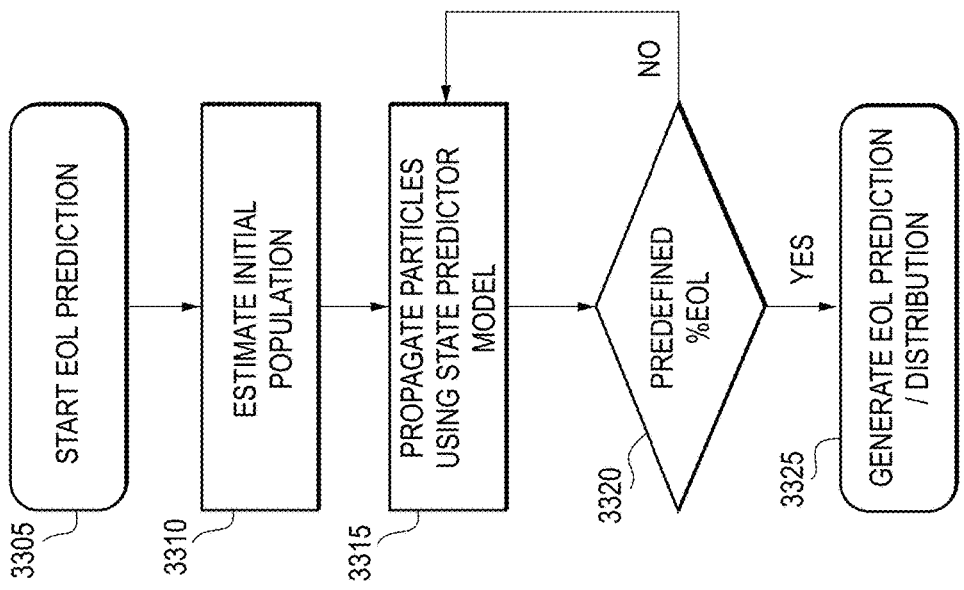
FIGS. 32 and 33 show exemplary flow charts for the particle filter determination and the end of life prediction, respectively.
Figure 32:
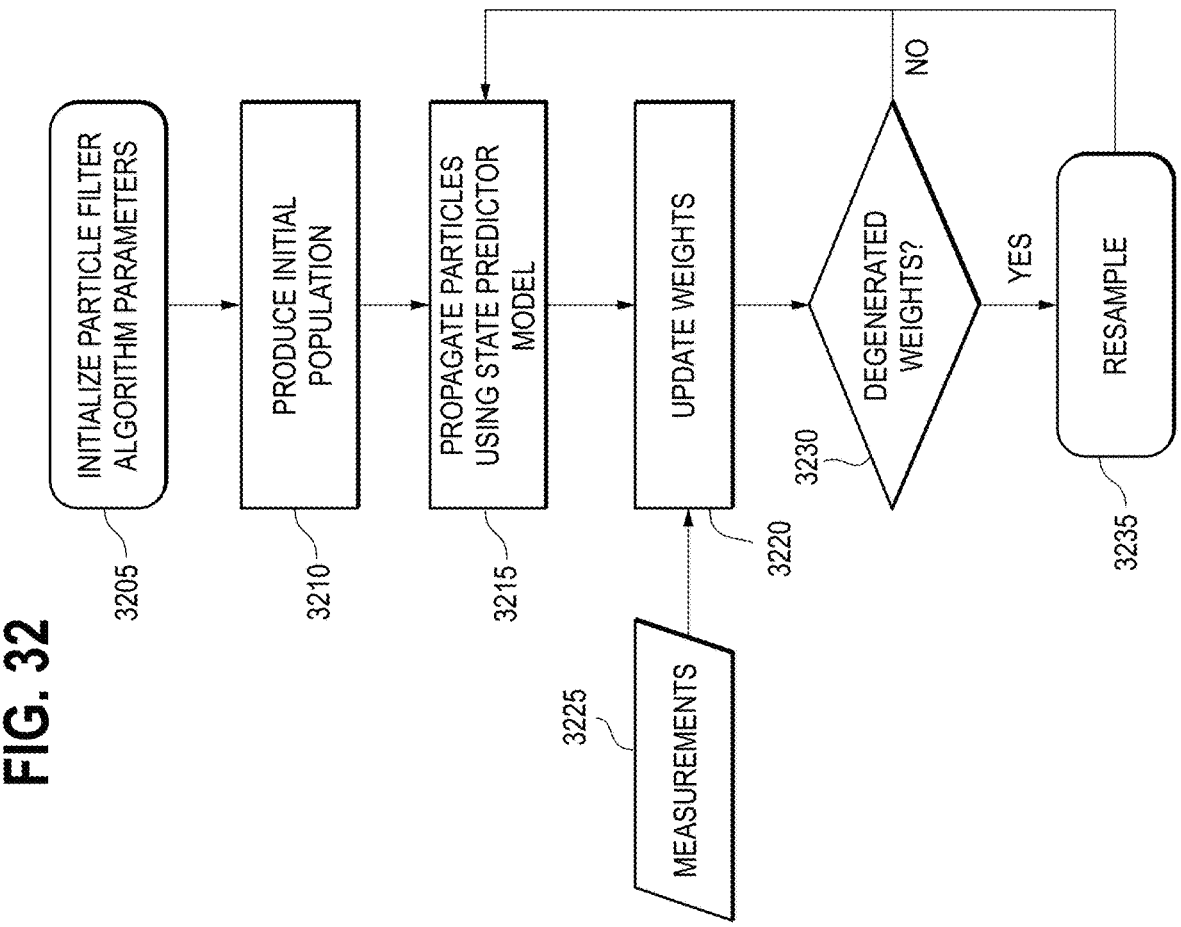

FIGS. 32 and 33 shows exemplary flow charts of the Particle Filter algorithm and the EOL prediction, respectively. In step 3205 the particle filter algorithm is initialized with initial particle parameters stored in memory. In step 3210 an initial particle population is produced based on the initial particle parameters. In step 3215 the particles are propagated using a state predictor model. In step 3220 the weights assigned to the various parameters are updated based on current measurements of the respective parameters in step 3225. In step 3230 a determination is made of whether the updated weights are degenerated weights. Degenerated weights are defined as differences in particle weights, i.e., when a small number of particles have high weights while the rest of the particles have small weights. When all resampled particles have similar weights within ⇐5%, the particle varying weights degeneracy is broken. A NO determination by step 3230 results in an iteration of the process by returning to step 3215. A YES determination by step 3230 results in resampling by step 3235 followed again by a further iteration by returning to step 3215. When degeneracy is not broken, resampling is required. Resampling (3235) is done on the current number of particles (particles propagated to step 3215) in order to avoid computation for those particles that do not contribute to the estimation. These particle weights are outliers and are rejected. The particle filtering process is also explained by the particle filtering equations as provided above.

FIG. 33 is a flow diagram of an exemplary method for providing an EOL determination. In step 3305 the EOL production is started. In step 3310 an estimate is made of the initial particle population (an arbitrary initial number of particles chosen for calculation; improved later in off-line algorithm and model training from stored raw data and analysis data). In step 3315 the particles are propagated using a state predictor model. In step 3320 a determination is made of whether a predetermined percentage of EOL has been reached for the component under consideration. A NO determination by step 3320 results in an iteration back to step 3315 in which a further propagation of particles using the state predictor model occurs followed by a determination again by step 3320. A YES determination by step 3320 results in step 3325 generating an EOL prediction. Continuous component EOL predictions (for degraded components) during the operation of the aircraft/system are stored in Analyzed Data 2655. This EOL prediction is used for future aircraft/system operation. The EOL prediction enables an EOL probability distribution function (PDF) to be created from this data and previous historic data by a fleet level prognostics engine on ground and off-line for further analysis to produce the EOL prediction that is provided to the product support team as a report. The above equations provide a more detailed explanation of the EOL determination. Note, that RUL is calculated at the current point in time and does not involve future state prediction. The calculation is identical to the EOL calculation presented above, with the exception that the RUL calculation is determined for the current-point-in-time using the EOL equations and methods described above.

What is claimed is:
1. A method implemented by a computing system that determines a prediction of degradation of components in a complex vehicle to enable cost effective maintenance and enhance vehicle availability, the method comprising the steps of:
receiving real-time data of a current state of performance parameters of the components;

determining by a microprocessor in the computing system, using at least one of a physics-based model of the respective components and an empirical model of the respective components, a first residue that is stored in memory of the computing system and is a difference between the current states of the performance parameters of the components and corresponding states of the performance parameters of the components as determined by the at least one of the physics-based model and the empirical model;

determining by the microprocessor using a physical system model of the respective components, a second residue that is stored in the memory of the computing system and is a difference between the current states of the performance parameters of the components and predetermined ranges of states of performance parameters of the corresponding components as determined by the physical system model;

determining by the microprocessor, based on a combination of the first and second residues retrieved from the memory by the microprocessor, a level of degradation for the respective components and a rate of change of degradation for the respective components; and determining, by the microprocessor, a remaining useful lifetime (RUL) of the respective components based on the level of degradation and a rate of change of degradation of the components, the RUL being a time for the respective component based on the rate of change of degradation projected for the level of degradation to equal a stored threshold level of degradation.

2. The method of claim 1 wherein the stored threshold level of degradation is a maximum amount of degradation allowed for acceptable performance of the respective component.

3. The method of claim 1 wherein the first residue is determined based on a combination of residues determined by each of the physics-based model of the respective components and the empirical model of the respective components.

4. The method of claim 1 wherein the receiving includes receiving degradation alarms as part of the real-time data where the presence of such degradation alarms associated with data for certain components causes the determining of the RUL of the certain components to be determined as a priority before the determination of the RUL for other components that do not have an associated degradation alarm.

5. The method of claim 1 wherein the stored threshold level of degradation varies for each of the respective components to facilitate different allowable levels of degradation dependent on the criticality of the component for operability of the vehicle.

6. The method of claim 1 further comprising:
storing a plurality of modes of operation of the vehicle and for each modes of operation storing a corresponding set of predetermined ranges of performance parameters;
determining the current mode of operation of the vehicle;
the predetermined ranges of states of performance parameters used by the physical system model is the corresponding set of predetermined ranges of performance parameters for the current mode of operation of the vehicle to accommodate ranges appropriate to the current mode of operation.

7. The method of claim 1 further comprising:
generating a maintenance order for a respective component when the RUL time for the respective component reaches a stored RUL threshold value.

8. The method of claim 1 wherein the physics-based model of the respective component includes a set of equations describing known relationships of physics characteristics where at least some of the physics characteristics have known values based on sensed parameter values for the component so that results defined by such equations can be calculated, results of the equations based on the current real-time data are subtracted from results of corresponding equations based on stored nominal parameter values to determine a residue for the physics-based model.

9. The method of claim 1 wherein the empirical model of the respective components includes a stored historical range of normal performance parameters for the respective components, the residue associated with the empirical model being determined by comparing the real-time data of a current state of performance parameters of the components with the historical range for corresponding performance parameters with the residue being amounts which the real-time data were outside the corresponding historical range.

10. The method of claim 1 further comprising:
determining an end of life (EOL) of the respective components based on current and future damage estimations of the respective components based on real-time particle filter analysis of the respective components.

* * * * *